United States Patent

Matsuzaki et al.

[11] Patent Number: 6,058,476
[45] Date of Patent: May 2, 2000

[54] ENCRYPTION APPARATUS FOR ENSURING SECURITY IN COMMUNICATION BETWEEN DEVICES

[75] Inventors: Natsume Matsuzaki, Minou; Syunji Harada, Osaka; Makoto Tatebayashi, Takarazuka, all of Japan

[73] Assignee: Matsushita Electric Industrial Co., Inc., Osaka, Japan

[21] Appl. No.: 08/859,881

[22] Filed: May 21, 1997

[30] Foreign Application Priority Data

May 22, 1996 [JP] Japan ................................. 8-126751

[51] Int. Cl.[7] ........................................................ H04L 9/00
[52] U.S. Cl. ........................... 713/169; 380/278; 380/283
[58] Field of Search ................................. 380/20, 25, 49, 380/21, 278, 283; 713/169

[56] References Cited

U.S. PATENT DOCUMENTS 5,745,571 4/1998 Zuk .............................................. 380/25
5,790,666 8/1998 Ooi .............................................. 380/20
5,917,915 6/1999 Hirose ......................................... 380/49

*Primary Examiner*—Salvatore Cangialosi
*Attorney, Agent, or Firm*—Price Gess & Ubell

[57] ABSTRACT

In the first devices, MPU 53 generates random number R1 as challenge data. Random number R3 is generated by first encryption IC 54, and then combined with random number R1, encrypted, and sent to second device 52 as encrypted text C1. When encrypted text C2 is similarly received from second device 52, first encryption IC 54 decrypts C2 and separates the decrypted result into first separated data RR2 and second separated data RR4. The first encryption IC 54 returns the first separated data to second device 52 as response data. MPU 53 compares the first separated data returned from second device 52 with random number R1, and in the event of a match, authenticates second device 52 as a legitimate device. The first encryption IC 54 generates the time-varying data transfer key by combining second separated data RR4 with random number R3, and transfers the digital copyrighted data to second device 52 by using the data transfer key.

33 Claims, 11 Drawing Sheets

ENCRYPTION APPARATUS FOR ENSURING SECURITY IN COMMUNICATION BETWEEN DEVICES

BACKGROUND OF THE INVENTION (1) Field of the Invention

This invention pertains to an encryption device which may be installed in communication devices which carry out encrypted communication by sharing a secret key, and especially pertains to an encryption device which can be realized with a small-scale circuit.

(2) Description of Prior Art

It is often necessary to protect data transmitted over communication lines from being illegally copied or altered by intercepting the line of communication.

For example, the data of copyrighted material such as a movie is often digitalized, compressed and digitally recorded onto an optical disc. This electronic data is retrieved by an optical disc playback device which is expanded with a data expansion device and played back by an audio/video playback device.

If the optical disc playback device and the data expansion device were separated into different devices which transmit data to one another, and this transmitted data were recorded by a data recording device and copied by a digital data copy device without the author's consent, then the movie's copyrighted material would be unlawfully copied to the effect of copyright infringement. The illegal copying of data through interception of the line of communication needs to be averted. Although for the most part a device's circuits and parts' specifications are not made known, often the electronic characteristics and signal protocols for the communication of data are, so that the illegal copying of data along the line of communication and the subsequent altering of that data becomes a serious problem.

A variety of techniques are well-known for eliminating this kind of unlawful act to protect the security of communications.

The most typical of these employ entity authentication mechanisms. Basically this a system where the sender of data authenticates the legitimacy of the receiver, and transmits data only when the receiver's legitimacy is confirmed. This keeps digital copyrighted material from being received by unauthorized devices.

In this case the entity which, like a receiver, certifies its own legitimacy is called the prover. The entity which confirms the other entity's legitimacy is called the verifier. The question here is not so much whether authentication is successful between the specified devices that carry out optical disc recording and playback, but is whether the devices conform to standards established by the optical disc-related device industry. As a consequence, the word "legitimate" is defined here as "conforming to established standards."

Prior Arts #1

The unilateral authentication method, which makes use of encryption technology recorded in the international standard ISO/IEC9798-2 is the first example of a prior art.

This authentication method is based on the prover proving to the verifier that it is in possession of the secret data known as the authentication key, without letting the key itself be known. Thus the verifier first selects random data and "throws" it to the prover. This action is called a challenge, and the thrown data is called challenge data.

The prover responds by encrypting the challenge data using the authentication key and the encryption converter it possesses. Then, it returns the encrypted data to the verifier. This action is called a response, and the data is called response data.

The verifier, which receives the response data, possesses the same authentication key and a decryption converter; which is an inverse converter for the encryption converter as those of the prover, so that the verifier now decrypts the response data received from the prover using the inverse converter. If the decrypted result matches the challenge data, the verifier judges the prover to be in possession of the authentication key, and authenticates the legitimacy of the prover. Unilateral authentication means that one side proves its legitimacy to the other.

The encryption converter T referred to here is a mapping of a collection of plaintext to a collection of encrypted text based on the key data S. Here, the relation $$TINV(S, T(S,X)) = X$$

is established between plaintext X and the inverse converted TINV, which maps a collection of encrypted text to plaintext in accordance with key data S. This means that after being converted and inversely converted plaintext X returns to its original state. The inverse of the encryption converter is called the decryption converter. In order to function as an encryption converter, it must be impossible to obtain plaintext X from encrypted text T(S,X) when key S in not known. Also, the encryption converter is written as E(S, ), while the decryption converter is written as D(S, ).

FIG. 1 shows an example of the authentication method recorded in the above Standards.

An illustration of digital copyrighted material mj being transferred from the first device 11 to the second device 12 is shown in FIG. 1. Here first device 11 is confirming the legitimacy of second device 12.

Below is a description of the conventional unilateral authentication method following the numbered steps shown in the diagram.

(1) The first device 11 generates random number R1. This is then transmitted to second device 12 through the line of communication as challenge data.

(2) When second device 12 receives this random number, the secret authentication key S loaded inside device 12 is used to encrypt this random number. The result, C1, is then transmitted along the line of communication to first device 11 as response data.

(3) When first device 11 receives this response data, authentication key S is used as a decryption key to decrypt C1.

(4) First device 11 compares the decryption result RR1 with the random nurber R1 temporarily stored inside first device 11. If they match, first device 11 considers second device 12 to be in possession of the same authentication key S, and confirms the entity in communication as a legitimate device. However if they do not match, then it judges the entity in communication an unauthorized device and terminates the process.

(5) After first device 11 authenticates second device 12 as legitimate, it transmits the copyrighted material along the line of communication.

In the event that a third party which did not possess the authentication key S was connected to the line of communication in the place of the second device 12, then this tertiary device would not be able to construct data of the correct value C1 in step (2), and as a consequence the results of decryption RR1 in step (3) would not match. Because of this, first device 11 would not transfer the copyrighted material to the third party in step (4).

However, if the same challenge data and response data is always used between first device 11 and second device 12, then it would be possible for a tertiary device with this knowledge to impersonate the second device 12. In order to avoid this first device 11 sends different challenge data (random numbers) each and every time.

Prior Arts #2

Incidentally, the example of prior art #1 would still permit forged data stored in a hard disc device to be unlawfully transmitted to second device 12 in possession of the legitimate authentication key. To fix this problem, it becomes necessary for second device 12 to confirm the legitimacy of first device 11 at the same time first device 11 confirms the legitimacy of second device 12.

It is also possible to intercept the data from the line of communication while it was being transmitted to second device 12, extract the data from the line or communication, and store it into for example, a hard disc unit. Of course this requires a knowledge of the electronic specifications of the signals on the line of communication and the data protocol, but since this information is not normally kept secret, there is a real danger of the copyrighted material being extracted. Because of this, authentication is not enough, to that it is also necessary to encrypt transmitted communications by distributing a randomly generated key to both devices and using that key to encrypt the copyrighted material. Hereinafter, the secret key for encrypting data of the transmitted copyrighted material is referred to as the data transfer key.

Below is an explanation of Prior Art #2, which expands on the unilateral authentication of Prior Art #1, and which conducts mutual authentication, distribution of the data transfer key, and encrypted communication.

FIG. 2 shows an example of a device which realizes mutual authentication.

FIG. 2 shows the case when the digital copyrighted material mj is transmitted from first device 21 to second device 22 after being encrypted.

Below is a description of the conventional mutual authentication method and the operations for distributing the data transfer key following the numbered steps shown in the diagram.

(1) First device 21 generates random number R1. This represents the first challenge data. Then this is sent through the line of communication to second device 22.

(2) Second device 22 generates random number R2, and creates combined data R1∥R2 by combining R2 with the random number R1 received from first device 21. Here the symbol ∥ means that the data from both numbers are lined up by place. Second device 22 encrypts this combined data R1∥R2 with the authentication key S as the encryption key, and transmits the encrypted text C1 to first device 21.

(3) First device 21 decrypts the encrypted text received from second device 22 using the authentication key S as the decryption key. The separated data in the upper position is called RR1, and the separated data in the lower position is called RR2.

(4) First device 21 compares the separated data RR1 with the random number R1 temporarily stored in first device 21. If these match then the entity in communication is judged to be a legitimate device in possession of the authentication key S. If these do not match, the authentication process is terminated.

(5) First device 21 generates random number K and sets this as the data transfer key K. First device 21 combines obtained separated data RR2 with the data transfer key K, encrypts this combined data RR2∥K with the authentication key S to make encrypted text C2, and transmits this to second device 22.

(6) Second device 22 uses authentication key S to decrypt the encrypted text C2 received from first device 21. The separated data in the upper position is RRR2, and the separated data in the lower position is KK.

(7) Second device 22 compares the separated data RRR2 with the random number KK temporarily stored in first device 21. If these match then the communication entity is judged to be a legitimate device in possession of the authentication key S. If these do not match, the authentication process is terminated. Meanwhile, after decryption the separated data KK is set as data transfer key KK.

(8) First device 21 encrypts the digital copyrighted material using the data transfer key K, and transmits this to second device 22 along the line of communication.

(9) Second device 22 decrypts this using the data transfer key KK, and acquires the digital copyrighted material.

If the first device 21 is in possession of the legitimate authentication key, and the second device 22 is not in possession of the legitimate authentication key, first device 21 judges the entity in communication to be lacking the legitimate authentication key in step (4), and can terminate the process. Likewise, if second device 22 was in possession of the legitimate authentication key while first device 21 was not, then second device 22 judges the entity in communication to be lacking the legitimate authentication key in step (7), and can terminate the process. By doing so the digital copyrighted material can be prevented from passing both to an unauthenticated device from an authenticated one, and from an unauthenticated device to an authenticated one.

Also, the digital copyrighted material could be electronically copied and stored in an electronic storage device once the digital copyrighted material is transmitted through the line of communication in step (8) after the authentication process is complete when both first device 21 and second device 22 are in possession of the legitimate authentication key. However, even if this were to happen, the digital copyrighted information is encrypted, thus becoming meaningless digital data. The original digital copyrighted material is, therefore, effectively protected.

Consequently, in order for the mutual authentication method using encryption techniques to be successful, it becomes a necessary condition that the authentication key loaded into first device 21 and second device 22 will not be easily understood by someone trying to steal the data. It is also necessary for the random number generator for the challenge data and the generator for data transfer key K to be inaccessible and unchangeable.

The most effective method of securing the confidentiality of these structural components is the implementation of the components which perform authentication, distribution of the data transfer key, and encrypted communication in an integrated circuit. Normally, extensive effort is required to analyze an IC, so authentication keys and the like will not be deciphered very easily.

In order to make the first device 21 of prior art #2 into an IC, such an IC (hereafter referred to as encryption IC) must be fitted with the following parts:

A random number generator to generate random number R1

A decryption unit to decrypt the encrypted text C1

A part to store authentication key S

A comparison unit to compare random number R1 with separated RR1

A random number generator for generating data transfer key K

An encryption part for combining separated data RR2 with the data transfer key K and encrypting them A part to store data transfer key K An encryption part to encrypt the digital copyrighted material using data transfer key K.

Second device 22 also requires a similar amount of hardware as listed above.

By making the prior authentication method possible through ICS, numerous functions, such as two random number generators and two converters (decryption unit and encryption unit), become necessary. Therefore, there is the problem of the circuit scale increasing, eventually leading to an increase in the cost of the device.

Also, in prior art #2 the data transfer key K for encrypting data is generated by first device 21, but due to the same reason that mutual authentication is necessary, it is preferable for the key to reflect values that have been generated by both devices.

As stated above, the ideal method for protecting the line between devices is one which seals the functions of authentication and their secret information in an IC. However, to do this using the prior method of equipping a single PC with all the parts for mutual authentication, the distribution of the data transfer key, and the encryption makes the size of the IC very large, and leads to an increase in cost.

SUMMARY OF THE INVENTION

The primary object of the present invention is to provide an encryption device possessing the minimum functions necessary for ensuring the security of communication between devices using only a small encryption IC.

The encryption IC possesses the following functions:

(1) Secure storage of the authentication key. Reading and writing of the key from external access is not possible.

(2) Secure distribution of the data transfer key. Reading and writing of the key from external access is not possible.

(3) By avoiding equipping the encryption IC with parts not pertaining to the security of the communication system, the size of the encryption IC can be reduced.

The second object of this invention is to provide a highly-secure encrypted communication system and is ideal for realization using a small encryption IC.

The primary object can be achieved with an encryption apparatus for devices which distribute a data transfer key and use the data transfer key to perform encrypted communication, the encryption apparatus including a first random number generation unit for generating a first random number for distributing the data transfer key; a first random number storage unit for storing the generated first random number; a first transmission unit for transmitting the generated first random number to a device in communication, wherein the device in communication is another device in current encrypted communication; a data transfer key generation unit for generating the data transfer key through use of the first random number stored by the first random number R1 storage unit, the data transfer key being time-varying; a transfer data encryption unit for encrypting the transfer data to be transferred in the encrypted communication through use of the data transfer key, wherein the first random number generation unit, the first random number storage unit, the data transfer key generation unit, and the transfer data encryption unit are implemented through a single IC, and wherein the first random number storage unit stores the first random number in an area tamper-proof from outside the IC.

The first random number directly related to the data transfer key is kept in the encryption IC which is externally inaccessible. Therefore the time-sensitive data transfer key is securely distributed to each device, and communications are encrypted. The encryption IC possesses only the minimum functions necessary for ensuring security of communication between devices, and so can be realized using a small-sized circuit.

Here, the encryption apparatus may further include a first encryption unit for encrypting the first random number, wherein the first encryption unit may be realized by circuits inside the IC, and wherein the first transmission unit may transmit the first random number, encrypted by the first encryption unit, to the device in communication.

With the above construction, it becomes impossible for a third party to learn the first random number which is directly related to the generation of the data transfer key. Therefore the secrecy of the data transfer key is maintained, so that even if the encryption algorithm and its inverse conversion algorithm are known, the security of encrypted communication can still be maintained.

Here, the encryption apparatus, wherein each of the devices which conduct encrypted communication authenticates the other device as a legitimate device by performing communication based on a challenge/response-type authentication protocol, wherein each encryption apparatus may further include a second random number generation unit for generating a second random number to be used as challenge data to be transmitted to the device in communication; and an authentication unit for judging whether response data returned from the device in communication in response to the challenge data and the second random number match, and in case of a match, for authenticating the device in communication as a legitimate device, and wherein the data transfer key unit generates the data transfer key in the event of authentication.

With the above construction, generation of the legitimate data transfer key occurs at the same time as success of mutual authentication between the devices, thereby improving the security of secret communication.

Here, the second random number generation unit and the authentication unit may be implemented by circuits provided outside the IC.

With the above construction, parts which have no direct relation to the security of the communication system, namely processors which are not directly related to the generation of the data transfer key are set outside the encryption IC, thereby reducing the size of the encryption IC.

Here, the encryption apparatus may further include a decryption unit for decrypting encrypted combined data sent from the device in communication; a separation unit for separating the decrypted combined data into a first separated data which corresponds to response data and a remaining second separated data; and second transmission unit for transmitting the first separated data to the device in communication, wherein the first encryption unit combines first random number with the second random number, and encrypts the resulting combined data, and the data transfer key generation unit generates the data transfer key by combining the first random number with the second separated data, and the decryption unit and the separation unit are implemented through circuits inside the IC.

The encryption apparatus may further include a second transmission unit for transmitting the second random number to the device in communication as challenge data; a decryption unit for decrypting encrypted combined data sent from the device in communication; and a separation unit for separating decrypted combined data into a first separated data corresponding to the response data, and a remaining second separated data, wherein the authentication unit performs the judgement and authentication with the first separated data as the response data sent back from the device in communication, wherein the first encryption unit combined the challenge data sent from the device in communication with the first random number, and encrypts the resulting combined data, and wherein the data transfer key generator generates the data transfer key by combining the first random number with the second separated data, and the decryption unit and the separation unit are implemented by circuits inside the IC.

With the above construction, an encryption apparatus which has the minimum functions necessary for protection of the security of communication between devices and which is equipped with a small-size encryption IC, can be realized.

Here, encryption algorithm used by the transfer data encryption unit may be identical to an algorithm used by at least one of the first encryption unit and the decryption unit.

With the above construction, the data transfer encryption unit, the first encryption unit and the decryption unit can be combined into a single converter, so circuit size of the encryption IC can be reduced.

Here, the encryption algorithm of the transfer data encryption unit may differ from and be simpler than an algorithm used by either of the encryption and the decryption unit.

With the above construction, even when encryption has to be repeatedly performed due to the large data size of the transfer data, the problem of dramatic increases in the data transfer time can be avoided.

Here, the transfer data encryption unit may divide the transfer data into blocks and encrypt each block using the part corresponding to the data transfer key.

With the above construction, the present encryption apparatus can be used even for the encrypted communication of large amounts of transfer data.

Here, the transfer data encryption unit may conduct encryption using exclusive OR on the blocks and the data transfer key.

With the above construction, a transfer data encryption unit can be realized through simple logic circuits.

Here, the encryption performed by the first encryption unit and the encryption performed by the second encryption unit may use the same conversion algorithm.

With the above construction, the first encryption unit and the decryption unit can be combined into one converter, so the circuit size of the encryption IC can be reduced.

Here, the first encryption unit and the decryption unit may decrypt and encrypt using key data stored in advance inside the IC, wherein one part of the key data is stored in a mask ROM area inside the IC, and the other part is stored in a programmable ROM area inside the IC.

With the above construction, the problems that occur when the authentication key is made up of only mask ROM, and the problems that occur when the authentication key is made up of only programmable ROM can be avoided.

Here, each of the devices which conduct encrypted communication may authenticiate the other device by performing communication based on a challenge/response-type authentication protocol, wherein each encryption apparatus may further include a decryption unit for decrypting encrypted combined data sent from the device in communication in response to the challenge data; a separation unit for separating decrypted combined data into a first separated data which corresponds to the response data and a remaining second separated data an authentication unit which judges whether or not the first random number matches the first separated data, and in the event of a match, authenticates the device in communication; a second encryption unit for encrypting the second separated data in the event of authentication; and a second transmission unit which transmits the encrypted second separated data to the device in communication as response data, wherein the data transfer key generation unit generates the data transfer key by combining the first random number and the second separated data, wherein the decryption unit, the separation unit, and the second encryption unit are implemented through circuits inside the IC.

With the above construction, only one random number is generated. Since this random number is used both for the authentication key and for the generation of the data transfer key, the size of the circuits for generation of random numbers in the encryption apparatus are reduced.

Furthermore, since random number generation for authentication and comparison processes are conducted inside the encryption IC, the level of security of encryption communications is heightened.

The above second object can be achieved by a communication system made up of a transmitter and a receiver which conduct distribution of a data transfer key and encrypted communication using the data transfer key, the transmitter and receiver, being devices in communication which authenticate each other through communication based on an authentication protocol of challenge/response type, wherein the transmitter and the receiver each include a first random number generation unit for generating a first random number to be used as challenge data; a second random number generation unit for generating a second random number to be used as the data transfer key; a combination unit for combining the first random number with the second random number; an encryption unit for encrypting the combined data; a first transmission unit for transmitting the encrypted combined data to the device in communication; a first receiving unit for receiving the encrypted combined data sent from the first transmission unit; a decryption unit for decrypting the received combined data; a separation unit for separating the decrypted combined data into a first separated data which corresponds to the response data, and a remaining second separated data to be used for the data transfer key, a second transmission unit fur transmitting the first separated data to the device in communication as response data, a second receiving unit for receiving the first separated data returned from the second transmission unit of the device in communication; a comparison unit which compares the received first separated data with the first random number, and in the event of a match, authenticates the device in communication as a legitimate device; a data transfer key generation unit for generating the data transfer key by combining the second random number with the second separated data; and an encrypted communication unit for conducting encrypted communication with the device in communication by using the generated data transfer key when authentication has been achieved.

This object can also be achieved by a communication system made up of a transmitter and a receiver which conduct distribution of a data transfer key and encrypted communication using the data transfer key, the transmitter and receiver, being devices in communication which mutually authenticate through communication based on an authentication protocol of challenge/response type, wherein the transmitter and the receiver each include a first random number generation unit for generating a first random number to be used as challenge data; a first transmission unit for transmitting the first random number to the device in communication; a first receiving unit for receiving the first random number sent from the first transmission unit of the device in communication; a second random number generation unit for generating a second random umber to be used for the data transfer key; a combination unit for combining the received first random number with the second random number; an encryption unit for encrypting the combined data; a second transmission unit for transmitting the encrypted combined data to the device in communication; a second receiving unit for receiving the encrypted combined data sent from the second transmission unit of the device in question; a decryption unit for decrypting the received combined data; a separation unit for separating the decrypted combined data into a first separated data which corresponds to the response data and a second separated data to be used for the data transfer key; a data transfer key generation unit for generating the data transfer key by combining the second random number with the second separated data; and an encrypted communication unit for conducting encrypted communication with the device in communication by using the generated data transfer key when authentication has been achieved.

The above object can further be achieved by a communication system made up of a transmitter and a receiver which conduct distribution of a data transfer key and encrypted communication using the data transfer key, the transmitter and receiver, being devices in communication which authenticate each other through communication based on an authentication protocol of challenge/response type, wherein the transmitter includes a first random number generation unit for generating a first random number; a first encryption unit for encrypting the first random number; and a first transmission unit for transmitting the encrypted first random number to the receiver, wherein the receiver includes a first receiving unit for receiving the encrypted random number; a first decryption unit for decrypting the received first random number; a second random number generator for generating a second random number; a first combination unit for generating combined data by combining the first random number with the second random number; a second encryption unit for encryption the combined data; and a second transmission unit for transmitting the encrypted combined data to the transmitter, wherein the transmitter further includes a second receiving unit for receiving the encrypted combined data; a second decryption unit for decrypting the received combined data; a separation unit for separating the decrypted combined data into a first separated data which corresponds to the first random number and a second separated data which corresponds to the second random number; a first comparison unit which compares the first random number with the first separated data, and in the event of a match, authenticates the receiver as a legitimate device; a third encryption unit for encrypting the second separated data in the event of authentication; and a first data transfer key generation unit for generating the data transfer key by combining the first random number generated by the first random number generation unit and second separated data obtained by the separation unit, wherein the receiving unit further included a third receiving unit for receiving the encrypted second separated data; a third decryption unit for decrypting the received second separated data; a second comparison unit which compares the decrypted second separated data with the second random number, and in the event of a match, authorizes the transmitter as a legitimate device; and a second data transfer key generation unit for generating the data transfer key by combining the first random number obtained by the first decryption unit with the second random number generated by the second random number generation unit, wherein the transmitter further includes a fourth encryption unit for encrypting transfer data using the data transfer key generated by the first data transfer key generation unit; and a fourth transmission unit for transmitting the encrypted transfer data to the receiver, and wherein the receiver also includes a fourth receiving unit to receive the encrypted transfer data from the transmitter; and a fourth decryption unit for decrypting the encrypted transfer data using the data transfer key generated by the second data transfer key generation unit.

The above is ideal for realizing an encryption communication system, which makes use of a small-size encryption IC. This is because generation of the data transfer key occurs when the transmitter and the receiver mutually authenticate, random numbers directly related to the generation of the data transfer key not are sent or received, and the two random numbers directly related to the generation of the data transfer key are provided by the transmitter and the receiver, respectively.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the Drawings.

DESCRIPTION OF THE PREFERRED EMBODIMENTS

Embodiment 1

Figure 1:
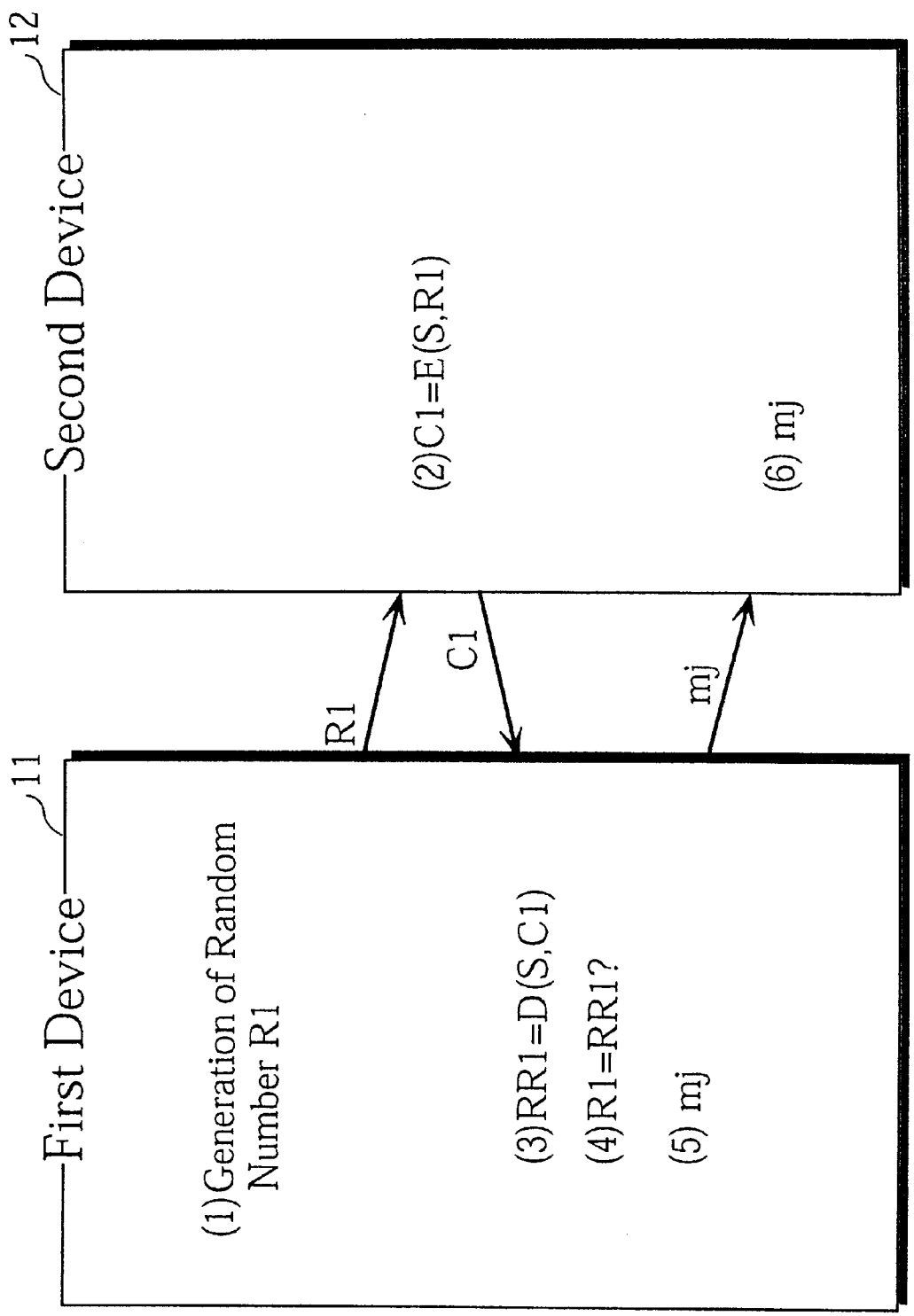
FIG. 1 is a diagram showing the processing sequence of unilateral authentication in Prior Art #1.
Figure 2:
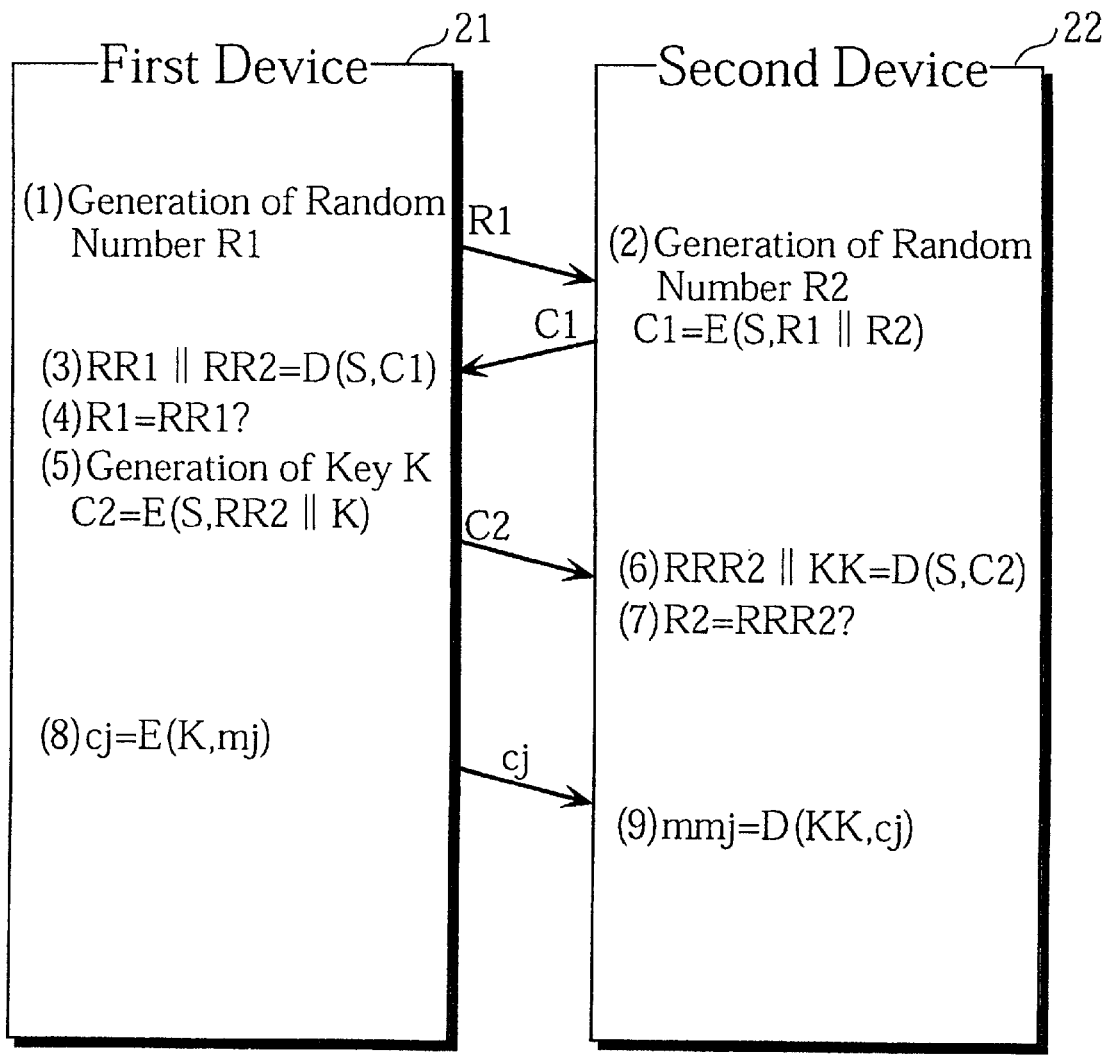
FIG. 2 is a diagram showing the processing sequence of mutual authentication in Prior Art #2.
Figure 3:
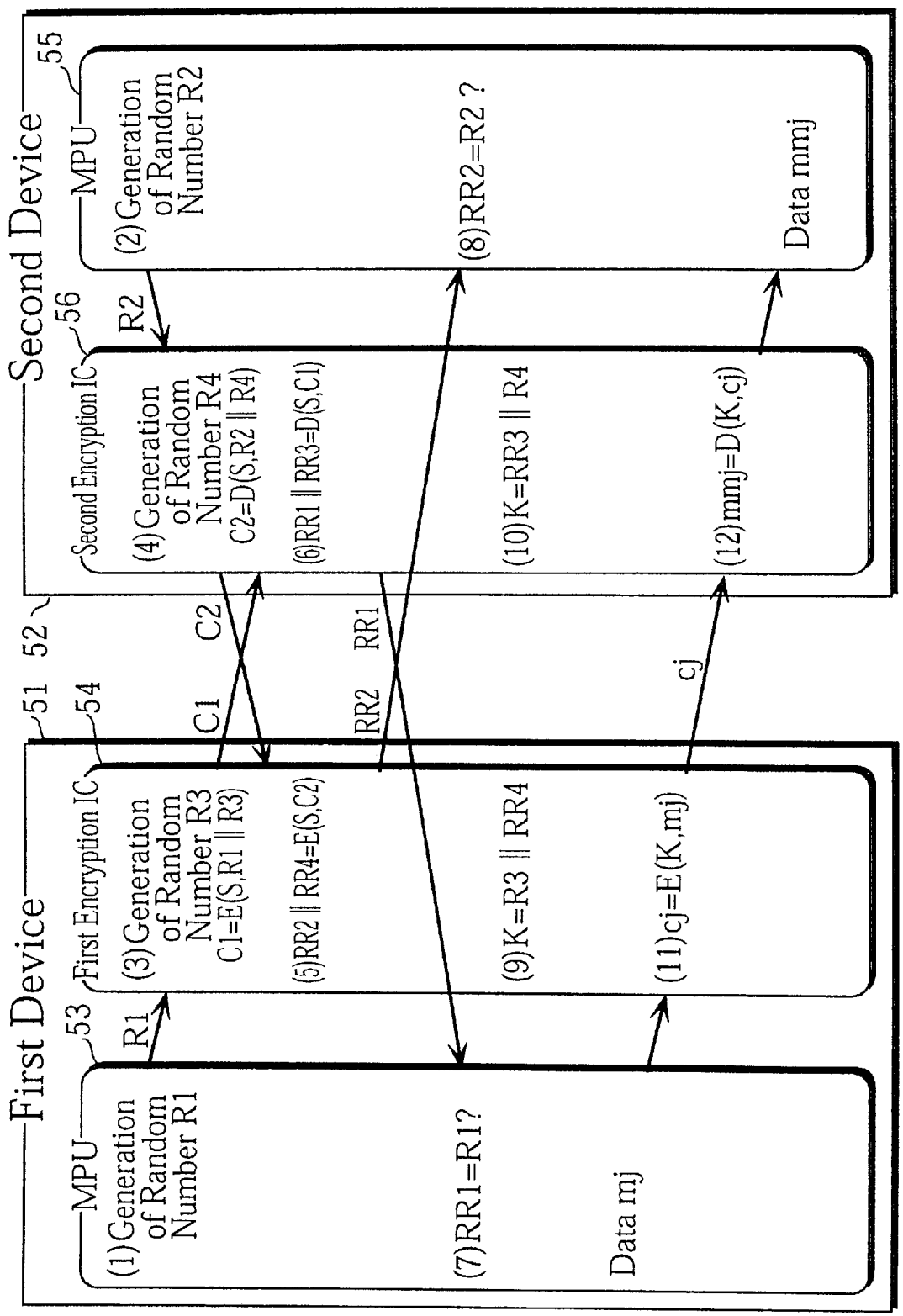
FIG. 3 is a diagram showing the processing sequence of an encryption apparatus pertaining to embodiment 1 of this invention.

FIG. 3 is a diagram showing the processing sequence for the first embodiment whereby a first and second device which are equipped with the encryption algorithm if of the present invention carry out mutual authentication, distribution of the data transfer key, and encrypted communication.

The transmission of digital copyrighted material mj from first device 51 to second device 52 is shown in FIG. 3. However, only the encryption apparatuses equipped in devices 51 and 52 are shown. The structural elements not in direct relation to the encryption apparatus (namely the transmitter-receiver and various parts which process the digital copyrighted material) have been omitted.

The encryption apparatus pertaining to this invention which is equipped in first device 51 can be roughly divided into MPU 53 and first encryption IC 54.

MPU 53 is constructed of ROM for maintaining the control program built into the encryption device, a general microprocessor for executing the control program, and RAM. MPU 53 carries out processing not directly related to the distribution of the data transfer key (steps (1), (7) in the diagram).

The first encryption IC 54 is a single-chip semiconductor IC, and carries out processing directly related to the distribution of the data transfer key (steps (3), (5), (9), and (11) in the diagram).

The encryption apparatus pertaining to this invention which is equipped in second device 52 can also be roughly divided into MPU 55 and second encryption IC 56.

MPU 55 is constructed of ROM for maintaining the control program built into the encryption device, a general microprocessor for executing the control program, and RAM. MPU 55 carries out processing not directly related to the distribution of the data transfer key (steps (2), (8) in the diagram).

The first encryption IC 56 is a single-chip semiconductor IC, and carries out processing directly related to the distribution of the data transfer key (steps (4), (6), (10), and (12) in the diagram).

It should be noted that this embodiment uses the 64 bit encryption algorithm S and its inverse conversion algorithm D, which are based on the Data Encryption Standard (DES). The conversion which uses encryption algorithm E is hereafter referred to as "encryption", while the conversion using inverse conversion algorithm D is referred to as "decryption". Also, first encryption IC 54 is equipped only with encryption algorithm F, while second encryption IC 56 is equipped with only inverse conversion algorithm D. This is both for reducing the size of encryption ICs 54 and 56, and for security, and is based on principles which are described with reference to the "Check Application" of Japanese Laid-Open Patent Application #7-261241 "inter-device communication protection apparatus" designed by the present inventors. In concrete terms, encryption algorithm E employs an algorithm with properties of substitution. Here substitution is defined as the conditions whereby "plaintext returns to its original state whenever the encrypted text is decrypted or the decrypted text is encrypted."

The following is an explanation of the operations or the encryption apparatus in embodiment 1 with reference to the steps in FIG. 3.

(1) MPU 53 inside first device 51 generates random number R1(32-bit), stores it and hands it to first encryption IC 54.

(2) As in step (1), MFU 55 inside second device 52 generates random number R2(32-bit), stores it and hands it to second encryption IC 56.

(3) First encryption IC 54 generates random number R3 (32-bit), and stores it in an externally inaccessible area. It then combines random number R1 generated by MPU 53 with random number R3 and performs encryption according to function E.

Here, the symbol ∥ stands for the 64-bit number made from a combination of two random numbers lined up by place (with random number R1 as the upper 32 bits, and random number R2 as the lower 32 bits). Also, the encryption makes use of the secret authentication key S which is retained commonly by first encryption IC 54 and second encryption IC 56 beforehand. First encryption IC 54 transmits the encryption result C1 to second device 52 through the transmitter inside first device 51 (not shown in the diagram).

(4) As in step 3, second encryption IC 56 generates random number R4 (32-bit), and stores it in an externally inaccessible area. The random number R2 generated by the previous MPU and the previous random number R4 are combined and decrypted with inverse converter algorithm D. Authentication key S is used in the decryption. Second encryption IC 56 transmits the decryption result C2 (64-bit) to first device 51 through the transmitter inside second device 52 (not shown in the diagram).

(5) First encryption IC 54 uses function E to encrypt decrypted text C2, received from second device 52. Then the obtained 64 bits are separated into separated data RR2 (upper 32 bits) and separated data RR4 (lower 32 bits). Furthermore the separated data RR2 is transmitted to second device 52 through the transmitter in first device 51, while separated data RR4 is not sent out, but is instead loaded into an externally inaccessible area in encryption IC 54.

As long as first encryption IC 54 and second encryption IC 56 are both legitimate, and both are in possession of the same authentication key S, then separated data RR2 will match the random number R2 generated by MPU 55, while separated data RR4 will match random number R4 stored inside second encryption IC 56.

(6) As in step (6), encrypted text C1, received from first encryption IC 54, is decrypted by second encryption IC 56 through use of inverse conversion algorithm D. Then the obtained 64 bits are separated into separated data RR1 (upper 32 bits) and separated data RR3 (lower 32 bits). Furthermore the separated data RR1 is transmitted to first device 51 through the transmitter in second device 52, while separated data RR3 is not sent out, but is instead stored in an externally inaccessible area in second encryption IC 56.

As long as first encryption IC 54 and second encryption IC 56 are both legitimate, and both are in possession of the same authentication key S, separated data RR1 will match the random number R1, while separated data RR3 will match random number R3.

(7) MPU 53 of first device 51 compares random number R1 stored in step (1) with separated data RR1 received from second device 52. If the event of a match, second device 52 and the second encryption IC 56 inside are both authenticated as legitimate devices.

(8) As in step (7), WPU 55 of second device 52 compares random number R2 stored in step (2) with separated data RR2 received from second device 52. If the event of a match, first device 51 and the first encryption IC 54 inside are both authenticated as legitimate devices.

(9) Data transfer key K is prepared by combining the random number R3 stored in step (3) with separated data RR4 in first encryption IC 54 The data transfer key K has upper 32 bits as random number R3, and lower 32 bits as separated data RR4. Because this data transfer key K is a combination of two random numbers, it is time-variable; that is, newly and randomly generated.

(10) As in step (9), data transfer key K is generated by combining the separated data RR3 with random data R4 stored in step (4) in second encryption IC 56. The data transfer key K has upper 32 bits as separated data RR3, and lower 32 bits as random number R4 stored in step (4). This data transfer key is time-variable as well.

Furthermore, as long as mutual authentication in steps (7) and (8) succeeds, then random number R3 generated in step (3) will match the separated data RR3 obtained in step (6). Likewise, random number R4 generated in step (4) will match separated data RR4 obtained in step (5). Consequently the data transfer keys K generated separately in steps (9) and (10) will match.

(11) The blocked digital copyrighted material transmitted from first device 51 mj (64-bit) is encrypted by the first encryption IC 54 inside first device 51 using the data transfer key obtained in step (9). The process of transmitting the obtained encrypted text Cj to second device 52 is repeated until all the digital copyrighted material to be transferred has been sent.

(12) In response to step (11), second encryption IC 56 inside second device 52 receives the encrypted digital copyrighted material Cj (64-bit) sent from first device 51, decrypts Cj using data transfer key K acquired in step (10), and sends the obtained digital copyrighted material mmj to MPU 55. This decryption is repeated as long as the digital copyrighted material Cj continues to be transmitted from first device 51.

In this way, mutual authentication, distribution of data transfer key K, and the encrypted communication of data is performed between first device 51 and second device 52 using the encryption apparatus of embodiment 1.

As is apparent from the above explanation, the encryption apparatus of embodiment 1 has the following characteristics.

The first characteristic is the secure protection of the data transfer key K inside the encryption IC. To be more specific, with the encryption apparatus equipped in first device 51, the two pieces of data used directly for the generation of data transfer key K, namely, random number R3 and separated data RR4 meet the following requirements.

The random number R3 is generated inside first encryption IC 54, and is maintained in an externally unreadable area without being outputted.

The separated data RR4 is generated (separate generation) inside first encryption IC 54, and is maintained in an externally unreadable area without being outputted.

The security of the encrypted communication between first device 51 and second device 52 is thus guaranteed even though encryption algorithm E and inverse conversion algorithm D are employed as known algorithms, because the data transfer key K is maintained inside first encryption IC 54.

The second characteristic is the restriction of the circuits inside encryption IC 54 to the necessary minimum. More specifically, with the encryption apparatus equipped in first device 51 and second device 52, the following processes are realized by the circuits outside of first encryption circuit 54, namely, MPU53.

Generation of random number R1

Comparison of random number R1 to separated data RR1.

Put simply, care has been taken that the circuits of the encryption IC 54 do not exceed the minimum necessary size. These two processes pertain to the authentication of the other device and are not directly related to the generation of data transfer key K. Therefore, even if unauthorized access were attempted by exploiting the fact that these processes are realized outside of the IC, it would still be impossible to access first device 51 and perform any potentially lucrative illegal operations. Further, response data RR2 corresponding to challenge data C2 from first device 51 is constructed inside the encryption IC.

Figure 4:
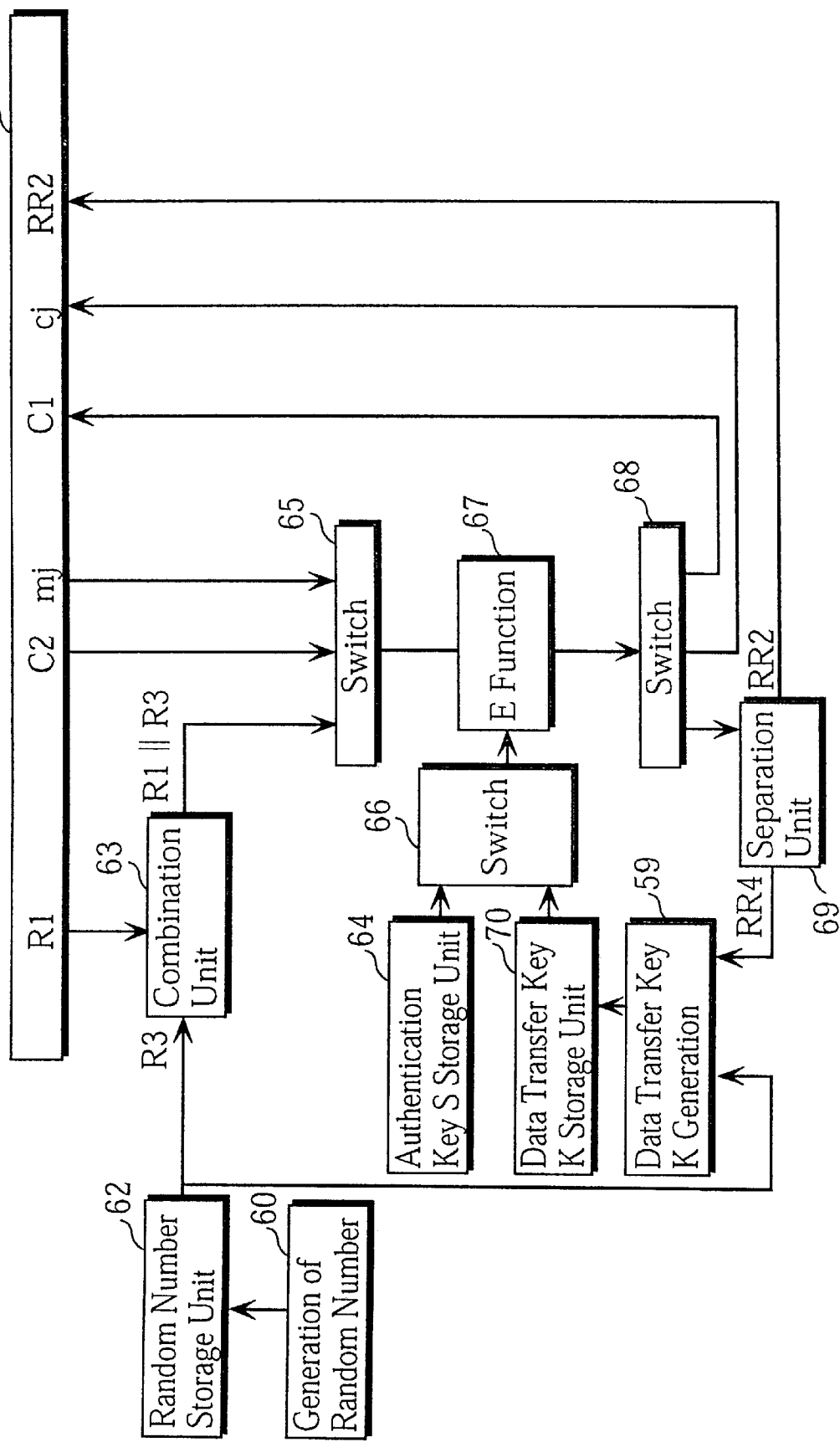
FIG. 4 is a block diagram showing the hardware configuration of first encryption IC 54 shown in FIG. 3.

FIG. 4 is a block diagram showing the hardware construction of first encryption IC 54.

Second encryption IC 56 can also be realized with hardware of similar scale.

External I/F unit 61 is the only input/output port for external access to the internal circuits of the first encryption IC.

Random number generator 60 generates the 32-bit random number R3.

Random number storage unit 62 is the memory circuit which keeps the random number R3 generated by the random number generator 60.

Combination unit 63 combines the 32-bit data R1 inputted through the external I/F unit 61 as the upper 32 bits and the random number R3 stored in random number storage unit 62 as the lower 32 bits.

Authentication key S storage unit 64 is the memory circuit which maintains authentication key S which is received beforehand.

Switch 64 is a 3 input/1 output multiplexer, while switch 66 is a 2 input/1 output multiplexer. Both are 64 bits wide.

E function 67 is an encryption circuit based on the encryption algorithm E.

Switch 68 is a 1 input/3 output multiplexer 64 bits wide.

Separation unit 69 separates the 64-bit data outputted from switch 68 into upper 32-bit data RR2 and lower 32-bit data RR4.

Data transfer key K generator 59 generates data transfer key K by combining random number R3 stored in random number storage unit 62 as the upper 32 bits, and the separated data RR4 separated in separation unit 69 as the lower 32 bits.

Data transfer key K storage unit 70 is a memory circuit which maintains data transfer key K generated by data transfer key k generator 59.

Next, FIG. 4 shows how each construction element operates in each step shown in FIG. 3.

In FIG. 3, random number generator 60 generates random number R3 and stores it in random number storage unit 62. Random number R1, inputted through external I/F unit 61, is combined with random number R3 in combination unit 63 and sent to E function 67 through switch 65. E function 67 receives authentication key S through switch 66 from authentication key S storage unit 64, uses S to encrypt combined data R1∥R3 outputted from combination unit 63, and then outputs the result C1 to second device 52 through switch 68 and external I/F unit 61.

In FIG. 3 steps (5) and (9) the decrypted text C2 inputted through the external I/F unit 61 is inputted to E function by way of switch 65. E function 67 receives authentication key S from authentication key S storage unit 64, uses S to encrypt decrypted text C2, and then sends C2 to separation unit 69 through switch 68. Separation unit 69 separates this into separated data RR2 and separated data RR4. Separated data RR2 is outputted through external I/F unit 61, while separated data RR4 is sent to data authentication key K generator 59. Data authentication key generator 59 stores data transfer key K in data transfer key K storage unit 70 after generation through combining random number R3 stored in random number storage unit 62, and separated data RR4 sent from separation unit 69.

In FIG. 3 step (11), the E function 67 uses data transfer key K stored in data transfer key K storage unit 70 to encrypt digital copyrighted material inputted through external I/F unit 61 and switch 65. The result Cj is outputted to second device 52 through switch 68 and external I/F unit 61.

Here, while specific bit length and data composition of the random numbers and encrypted text are shown in embodiment 1, the invention is not limited to these. For example, in the above step (5), the 32-bit random numbers R1 and R2 are combined to make 64 bits, a which is then inputted to 64-bit encryption function E, to give 64-bit encrypted text C1. Here, each random number can be set at 64 bits, for example, so that by performing encryption twice according to the encryption algorithm, 128 encrypted text C1 can be generated. However, in this situation it is necessary that parts concerned with random number R1 and parts concerned with random number R2 not be easily detached from encrypted text C1. One way to do this is encryption with a chain like the CBC mode. For more about CBC mode, consult pages 193–197 of *Applied Cryptography*, Second Edition, by Bruce Schneider, John Wiley & Sons, Inc., 1996.

In embodiment 1 the size of the hardware has been reduced by equipping first encryption IC 54 with only the encryption function E, and second encryption IC 56 with only its inverse function D. As pointed out above, however, this itself is not the essence of this invention. In other words, these items should be decided based on the permitted circuit size and algorithm type for encryption ICs 54 and 56. For example, each could be in possession of both the encryption algorithm E and the inverse conversion algorithm D so that both could use encryption algorithm E to encrypt random numbers and use inverse conversion algorithm D to decrypt data sent from the other device. This is because the present invention is in fact characterized by having at least the construction directly related to the generation of the data transfer key K provided in a single IC to maintain the secrecy of communication.

Also, in embodiment 1 the random number R1 could, for example, be generated inside encryption IC 54 in step (1). By doing so, the possibility of first encryption IC 54 being used as a decryption device can be avoided, and a safer encryption apparatus can be achieved. In other words, in embodiment 1 the random number R1 is generated outside first encryption IC 54, which outputs encrypted text C1 based on this random number R1. The encrypted text C1 is influenced by random number R3 generated inside first encryption IC 54, but if random number R3 is not of sufficiently random value, then first encryption IC 54 could be used as a decryption device for unauthorized purposes. Therefore, by generating random number R1 inside first encryption IC 54, the above chances for attack are avoided, and the encryption apparatus becomes more secure.

Embodiment 2

Embodiment 1 is shown net as an alternate example of steps of embodiment 1 shown in FIG. 3. Hardware is of similar scale to that of embodiment 1 shown in FIG. 4. In embodiment 1, the response data was transmitted encrypted while the challenge data was not, but in embodiment 2 the challenge data is transmitted encrypted while the response data is not. The explanation below focuses on the differences with embodiment 1.

Figure 5:
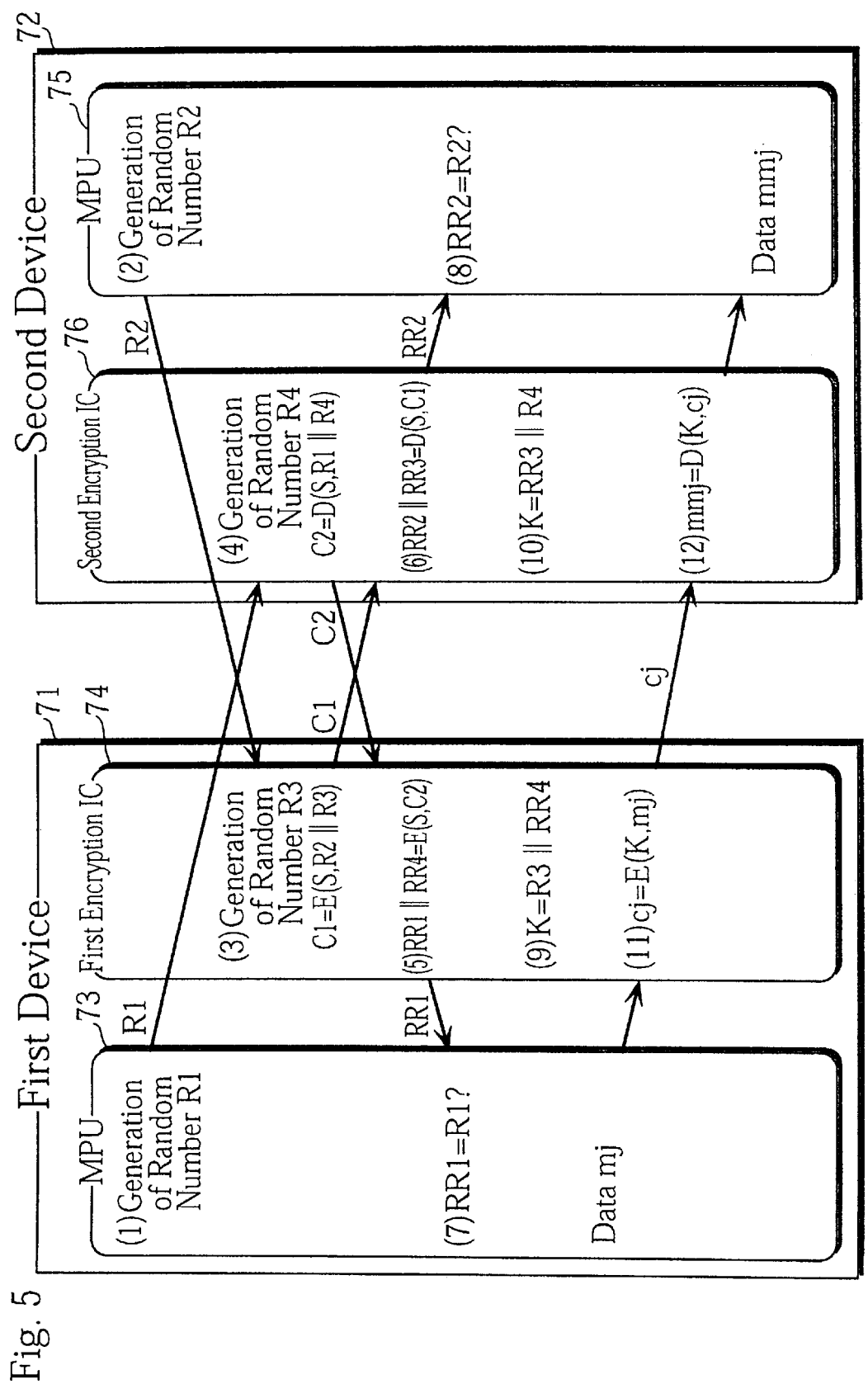
FIG. 5 is a diagram showing the processing sequence of an encryption apparatus pertaining to embodiment 2 of this invention.

FIG. 5 shows the processing sequence in embodiment 2 for mutual authentication, distribution of data transfer key K, and encrypted communication of data between first device 71 and second device 72, which are equipped with encryption apparatus pertaining to this invention.

FIG. 5 shows digital copyrighted material mj being transmitted from first device 71 to second device 72.

MPU 73, first encryption IC 74, MPU 75 and second encryption IC 76 each correspond to MPU 53, first encryption IC 54. MPU 55 and second encryption IC 56 in embodiment 1, Except for the difference in processing procedures, hardware configuration is identical to embodiment 1.

Below is an explanation of the operations of the encryption apparatus of embodiment 2 following the numbered steps shown in FIG. 5.

(1) MPU 73 inside first device 71 generates random number R1(32-bit), stores it and sends it to second encryption IC 72 through the transmitter of first device 71 (not shown in the figure). In second device 72 this is sent to second encryption IC 76.

(2) As in step (1), MPU 75 inside second device 72 generates random number R2(32-bit), stores it and transmits it to first device 71 through the transmitter of second device 72. First device 71 hands this to first encryption IC 74.

(3) First encryption IC 74 generates random number R3 (32-bit), and stores it in an externally inaccessible area. It then combines the random numbers received second device 72, R1 and R2, and performs encryption according to function E using the secret authentication key S which is retained commonly by first encryption IC 54 and second encryption IC 76 beforehand. First encryption IC 74 transmits the resulting encryption text C1 (64-bit) to second device 72

(4) As in step 3, second encryption IC 76 generates random number R4 (64-bit), and stores it in an externally inaccessible area. Random number R1 is received from first device 71, combined with random number R4, and the result is decrypted with inverse conversion algorithm D using authentication key S. Second encryption IC 76 transmits the resulting decryption text C2 (64-bit) to first device 71.

(5) First encryption IC 74 uses E function to encrypt decrypted text C2 received from second encryption IC 76 with authentication key S. Of the 64-bit result, the upper 32 bits become separated data RR1, while the lower 32 bits become separated data RR4. Then, separated data RR1 is sent to MPU 73 in first device 71, while separated data RR4 is not sent outside, but is instead stored in an area in first encryption IC 74 externally inaccessible.

Here, if both encryption ICs are legitimate and both are in possession of the same authentication key S, then the separated data RR1 will be the same as the random number R1 generated by MFU 73 inside first device 71, and separated RR4 will be the same as random number R4 generated by second encryption IC 76.

(6) As in step (5), second encryption IC 76 uses inverse conversion algorithm to decrypt resulting encrypted text C1 received from first encryption IC 74 with authentication key S. Of the resulting 64-bit data, the upper 32 bits become separated data RR2, while the lower 32 bits become separated data RR3. Then, separated data RR2 is sent to MPU 75 in second device 72, while separated data RR3 is not sent outside, but is instead stored in an area inaccessible from outside second encryption IC 76.

Here, if both encryption ICs are legitimate and both are in possession of the same authentication key S, then the separated data RR2 will be the same as the random number R1 generated by MPU 75 inside second device 72, and separated data RR3 will be the same as random number R3 generated by first encryption IC 74.

(7) MPU 73 inside first device 71 compares the previously stored R1 with separated data RR1 received from first encryption IC 74. If they match, then second device 72 and its second encryption IC 76 are authenticated as legitimate devices.

(8) As in step (7), MPU 75 inside second device 72 compares the previously stored R2 with separated data RR2 received from second encryption IC 76. If they match, then first device 71 and its first encryption IC 74 are authenticated as legitimate devices.

(9) Data transfer key K is constructed inside first encryption IC 74 using random number R3 and separated data RR4. The combination of both of these is shown in the drawing as data transfer key K (64-bit).

(10) As in step (9), Data transfer key K is constructed inside second encryption IC 76 using random number R4 and separated data RR3 as in first encryption IC 74. The combination of both of these is shown in the drawing as data transfer key K (64-bit).

(11) The digital copyrighted material mj, is divided into blocks and sent from MPU 73, is encrypted within first encryption IC 74 of first device 71 using the data transfer key K obtained in step (9). The process of transmitting the resulting encrypted test Cj is repeated until all of the digital copyrighted material that is to be transmitted has been sent.

(12) Corresponding to step (11), the digital copyrighted material Cj, having been encrypted and sent from first device 71, is decrypted within second encryption IC 76 of second device 72 using the data transfer key K obtained in step (10). The obtained digital copyrighted material mmj is sent to MPU 75. This decryption continues as long as digital copyrighted material text Cj is received.

In this way mutual authentication, distribution of data transfer key K, and encrypted communication are performed by first device 71 and second device 72 using the encryption apparatus of embodiment 2 in the same manner as embodiment 1.

Here, the hardware construction or this embodiment is identical to the encryption apparatus of and embodiment 1, with only the processing procedures, namely, connection of each hardware's constructional elements and order of execution being different. Therefore, the characteristics of this embodiment's encryption apparatus and alternate examples are the same as those of embodiment 1.

(Embodiment 3)

The encryption apparatus of above embodiments 1 and 2 have the following points in common.

(1) Two random numbers are generated by the two devices. One is used solely for authentication, while the other is used solely for data transfer key K.

(2) The random number used for data transfer key K is never sent outside the encryption IC in its original state, while the random number used for authentication is made known outside the encryption IC.

The encryption apparatus of embodiment 3, on the other hand, generates only one random number, and uses that for the generation of both authentication and the data transfer key K. This is for reducing the burden of random number generation inside the encryption IC compared to embodiments 1 and 2.

Also, random number generation and comparative processing for authentication are conducted inside the encryption IC. In other words, unlike embodiments 1 and 2, authentication processing is also conducted within the circuits of the encryption IC, in addition to the generation of data transfer key K. As stated above, this is to deal with the unauthorized use of the encryption IC as a method of decrypting the encrypted text, and so better protects the security of the encrypted communication.

Figure 6:
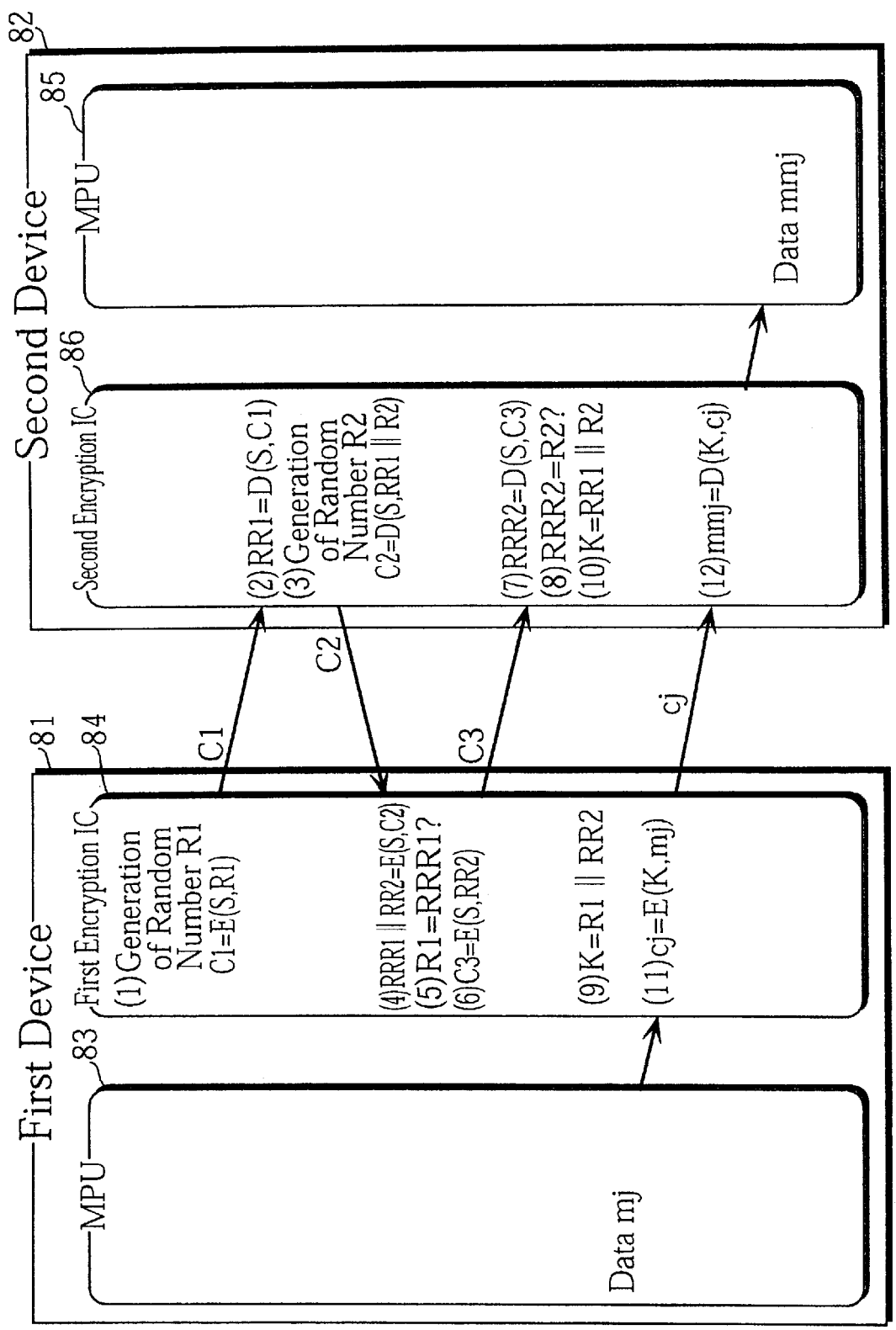
FIG. 6 is a diagram showing the processing sequence of an encryption apparatus pertaining to embodiment 3 of this invention.

FIG. 6 shows the processing sequence of embodiment 3 which conducts mutual authentication, distribution of data transfer key K, and encrypted communication of data between first device 71 and second device 72, which are equipped with encryption apparatus pertaining to this invention.

FIG. 6 shows digital copyrighted material mj being transmitted from first device θ1 to second device 82.

And, as in embodiments 1 and 2, the encryption apparatus pertaining to this invention is also mostly comprised of MPUs 83 and 85, and encryption ICs 84 and 86. However, MPUs 83 and 85 only perform the function of sending digital copyrighted material mj to encryption ICs 84 and 86, so the encryption apparatus pertaining to this invention is practically only made up of ICs 84 and 86.

First encryption IC 84 and second encryption IC 86 are both single-chip semiconductor ICs, as in embodiments 1 and 2.

The following is an explanation of the operations of the encryption apparatus in embodiment 3 following the steps in FIG. 6.

(1) Random number R1 is generated inside first encryption IC 84 which stores it, encrypts it with E function and transmits it to second device 82 through the transmitter of first device 81 (not shown). The encryption makes use of the secret authentication key S also provided inside the second device 82. Second device 82 then sends the received encrypted text C1 to second encryption IC 86.

(2) Second encryption IC 96 decrypts the received encrypted text C1 with inverse conversion algorithm D, and acquires decrypted text RR1. If both first encryption IC 84 and second encryption IC 86 are legitimate devices, then decrypted text RR1 should match random number R1.

(3) Random number R2 is generated inside second encryption IC 86 which stores it, combines it with decrypted text RR1, and decrypts the result with inverse conversion algorithm D. Authentication key S is used in the decryption. Second encryption IC 86 then transmits decrypted text C2 to first device 81 through the transmitter of second device 92 (not shown) First device 81 then gives this to first encryption IC 84.

(4) First encryption IC 84 encrypts decrypted tent C2 with E function, and divides the result into separated data RRR1 and separated data RR2. Furthermore, if the devices in communication are legitimate, then separated data RRR1 will match both decrypted text RR1 and random number R1, while separated data RR2 will match random number R2.

(5) First encryption IC 84 compares random number R1 previously stored, with separated data RRR1. If they match then second encryption IC 86 and second device 82 which contains second encryption IC 86 are authenticated as legitimate devices.

(6) Separated data RR2 is then encrypted by first encryption IC using E function, and is transmitted to second device 82. Second device 82 then gives this encrypted text C3 to second encryption IC 86.

(7) Encrypted text C3 is decrypted by second encryption IC 86 with inverse conversion algorithm D, and decrypted text RRR2 is acquired.

(8) Second encryption IC then compares random number R2 stored in step (3) with the decrypted text RRR2. If they match, then first encryption IC 84 and first device 81 which contains first encryption IC 84 are authenticated as legitimate devices.

(9) First encryption IC 84 generates data transfer key K by combining random number R1 and separated data RR2.

(10) Second encryption IC 86 generates data transfer key K by combining decrypted text RR1 with random number R2.

(11) First encryption IC 84 inside first device 81 encrypts digital copyrighted material mj (64-bit), which has been divided into blocks and received from MFU 83 using data transfer key K obtained in step (9). The process of transmitting obtained encrypted text Cj to second device 82 is repeated until all of the digital copyrighted material to be sent has been transmitted.

(12) Corresponding to step (11), second encryption IC 86 inside second device 82 receives encrypted digital copyrighted material Cj (64-bit) transmitted from first device 81 decrypts this with data transfer key K acquired in step (10), and sends obtained digital copyrighted material mmj to MPU 85. This decryption continues as long as digital copyrighted material Cj is received from first device 81.

In this manner mutual authentication, distribution of data transfer key K, and encrypted communication of data are conducted by first device 81 and second device 82 using the encryption apparatus of embodiment 3.

Furthermore, a single random number is encrypted in steps (1), (2), (6), and (7), while a combination of two random numbers is encrypted in steps (3) and (4). When E function and inverse conversion algorithm D are used, all random numbers should be set to 32 bits, and the former group should be appended with a fixed 32-bit number padded onto the remaining 32 bits. For example, the lower 32 bits can be set to random, with the upper 32 bits set as all zeros. Also, the combined 64 bits of the steps (3) and (4) into each function should be inputted without amendment.

Also, when the bit length of the random numbers is doubled into 64 bits, the former group of random numbers should be inputted into the functions without amendment into the functions without amendment, while for the latter group of random numbers each function should be performed twice for each random number, with linked encryption such as CBC mode.

Unlike embodiments 1 and 2, the above embodiment 3 uses the same random number for authentication and for distribution of the data transfer key. Generation of the random number for authentication and comparison processing for authentication are also conducted inside the encryption IC. Therefore, this is more secure against attacks which try to use encryption IC as a decryption device, since the random number in its original state never appears outside the encryption IC. As a result, a high level of security can be achieved even though the number of bits for each random number is limited.

Embodiment 4

Next is a description of the encryption apparatus pertaining to embodiment 4.

This apparatus is an embodiment of the present invention which realizes and pursues compactness of the encryption IC, and in different from the above embodiments 1–3 in the area of unilateral authentication, and making known the data transfer key. However, the encryption algorithm E and its inverse conversion algorithm D are assumed secret.

Figure 7:
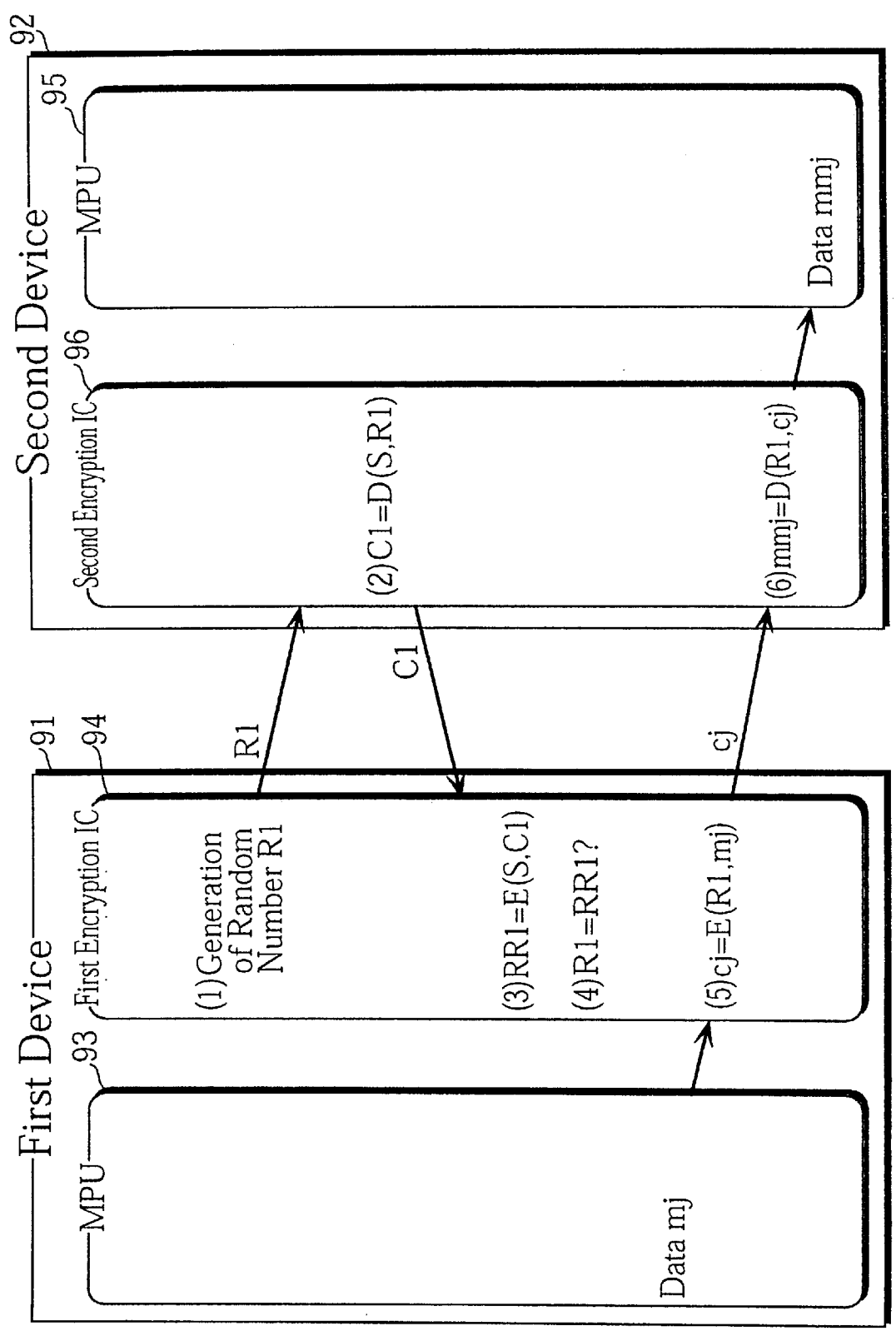
FIG. 7 is a diagram showing the processing sequence of an encryption apparatus pertaining to embodiment 4 of this invention.

FIG. 7 shows the processing sequence of digital copyrighted material mj being transferred from first device 91 to second device 92.

Figure 8:
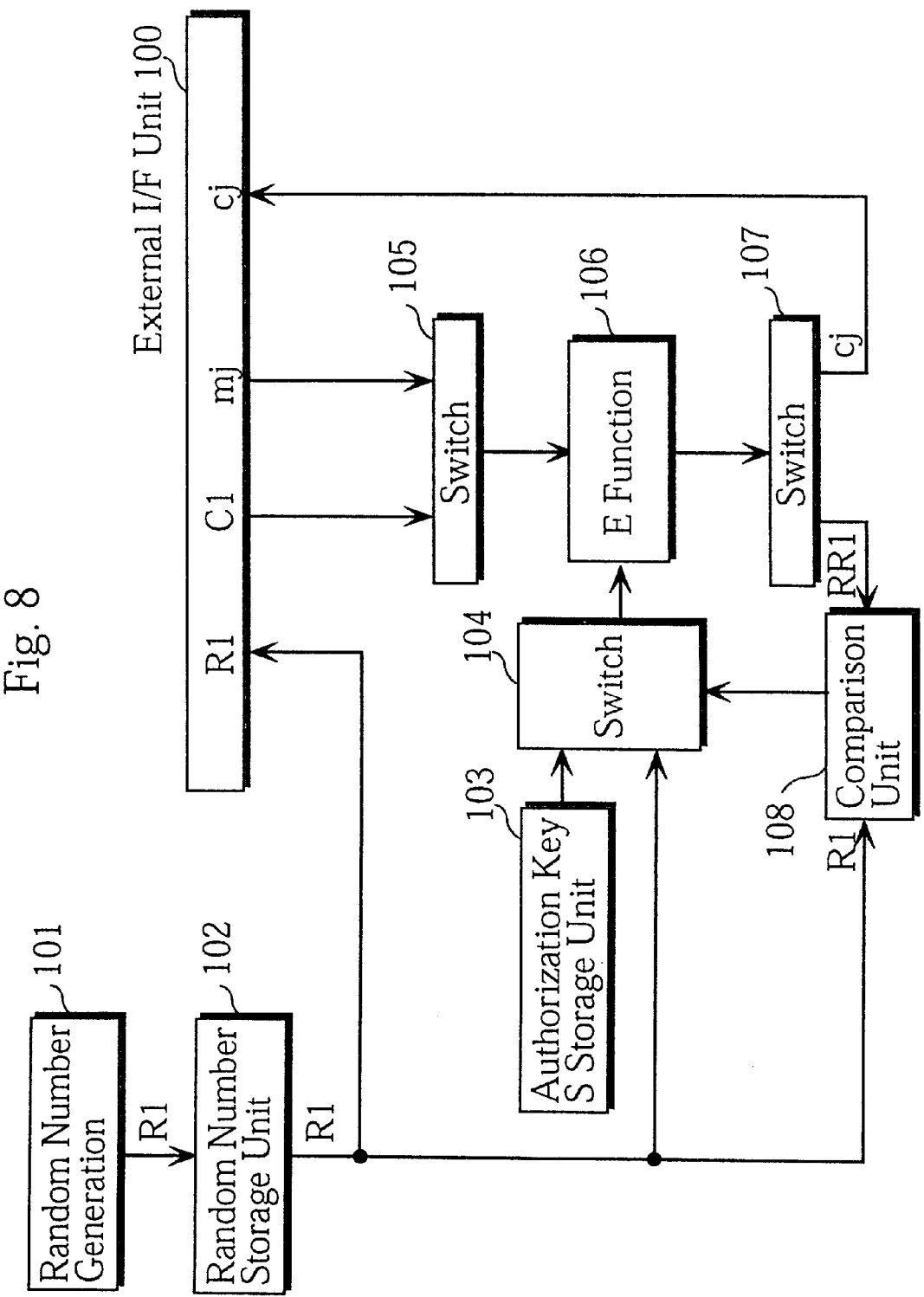
FIG. 8 is a block diagram showing the hardware configuration of first encryption IC 94 shown in FIG. 7.
Figure 9:
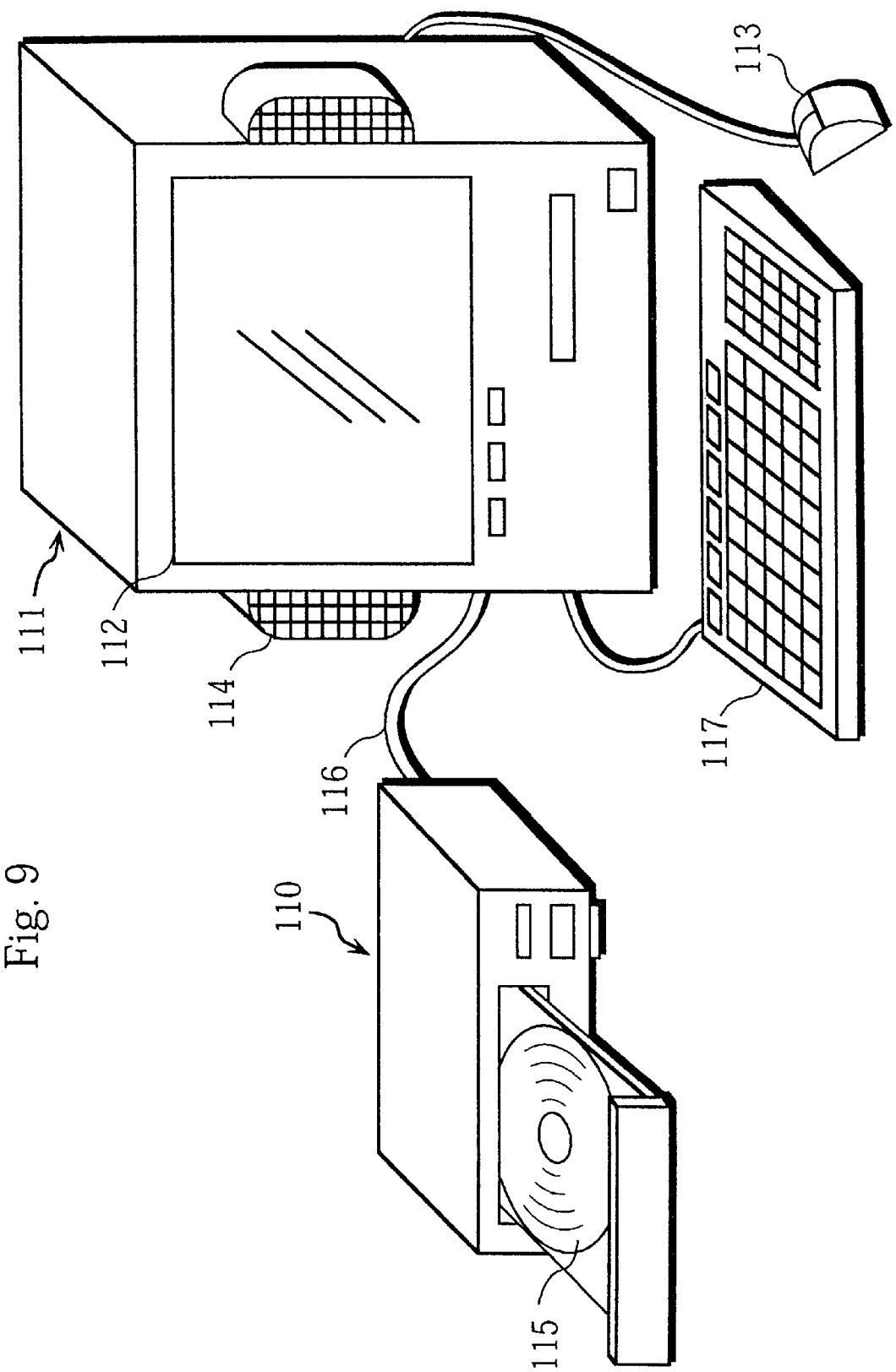
FIG. 9 is a diagram showing a specific example of the application of the encryption apparatus pertaining to this invention in a communication system.

FIG. 8 is a block diagram showing the hardware composition of first device 91.

(1) First, random number generator of first encryption IC generates random number R1, which is used both as challenge data and as the data transfer key. R1 is then stored in random number storage unit 102, and transmitted to second device 92 through external I/F unit 100.

(2) In response, second encryption IC 96 decrypts the received random number R1 using authentication key S which is also distributed in first encryption IC 94. The obtained decrypted text C1 is then sent to first device 91.

(3) In first encryption IC 94, E function 106 encrypts decrypted text C1, received through external I/F unit and switch 105, using the authentication key S stored beforehand in authentication key S storage unit 103. The resulting data RAi is sent to comparison unit 108 by way of switch 107, where it is compared to random number R1 stored in random number storage unit 102.

(4) If, as a result, there in a match, then second device 92 can be authenticated as a legitimate device, so comparison unit 108 controls switch 104 so that random number R1 stored in random number storage unit 102 is used as the data transfer key.

(5) E function 106 encrypts digital copyrighted material mj, sent by way of external I/F unit 100 and switch 105, using random number R1, sent by way of switch 104, and then sends this to second unit 92 through switch 107 and I/F unit 100.

(6) Second encryption circuit IC 96 inside second device 92 decrypts the digital copyrighted material Cj sent from first device 91 using random number R1 received in step (2) as the data transfer key. The resulting digital copyrighted material mmj is sent to MPU 95.

In this manner, authentication, distribution of the data transfer key, and encrypted communication is realized in this embodiment through fewer steps and components than embodiments 1–3.

Furthermore, because random number R1, sent from first device 91 to second device 92, is used as the data transfer key as it is, the data transfer key could be easily known to a third party. However, even if a third party aware of the data transfer key attempted to decrypt and gain access to the digital copyrighted material Cj, the encryption algorithm E and the inverse conversion algorithm D is kept secret, as illustrated above, so such an attempt would not succeed.

Alternatively, if a third party were to decipher the encryption algorithm by hacking the appropriate random number, only the random number generator 101 can store a new random number R1 into random number storage unit 102, so such an attempt would also fail because it is not possible to store a newly-generated random number R1 into random number storage unit 101 from outside first encryption IC 94.

In this manner, if the encryption algorithm and the inverse conversion algorithm are made secret, then authentication, generation of the data transfer key, and encryption communication can be realized even with the compact encryption IC described in this embodiment.

Furthermore, a favorable method for setting (storing) authentication key S into the encryption IC in embodiments 1–4 is listed below.

Basically, this is a method in which a portion of authentication key S is set before the manufacture of encryption IC, and the remaining portion is inscribed after manufacture of the encryption IC. A portion of the authentication key S storage unit 64 is made up of mask ROM, in which a portion of the authentication key S is inscribed in advance, while the remaining portion is made up of programmable ROM.

If the construction relied exclusively on mask ROM, then It would be secure because the creation of the final encryption IC eliminates the possibility of human error, but there is also the drawback that it is easy to analyze the set value by analyzing the chip through reverse engineering. On the other hand, if the construction relied exclusively on programmable ROM, then although the analysis of the set value through reverse engineering of the chip is difficult, there are drawbacks such as potential for human error during setting, and the possibility of improper access. The use of both technologies is to make up for each of their respective drawbacks.

Below is another concrete example of the encryption algorithms in the encrypted communication of embodiments 1–4.

The digital copyrighted material of the sender is divided into 64-bit blocks and an exclusive OR is taken for each bit with the data transfer key K (64-bit). In the same manner the receiver takes exclusive OR between the received 64-bit encrypted text and the data transfer key K to restore the original blocks.

Also, there is the method which each block of the data transfer key K in use is renewed with synchronization between the sender and receiver, instead of the data transfer key K being fixed. There, E function and algorithm D may be used for the updating. The encryption/decryption within the block may be exclusive OR as stated above.

Embodiments 1–4 are explained using examples of challenge/response authentication methods, but this invention is not limited to such examples. This could be another type challenge/response authentication method which generates random numbers on the authenticator's side, sends them as challenge data, and compares the response data sent from the prover to the reference response data generated by the verifier.

Technologies which securely conduct authentication and encrypted communication in small-sized circuits are described in the embodiments 1–4, but it is obvious that there is a trade-off between the level of security and the size of the circuits necessary for such security. Therefore, if there is room in the MPU and leeway in the circuit size which can be contained inside the encryption IC, then the security of encrypted communication can be strengthened by adding a new conversion method which executes data conversion F( ).

(1) One such method is to prevent challenge data's plaintext and response data's plaintext from flowing through the line of communication.

For example, the processing sequence shown in FIG. 3, in which first device 51 authenticates second device 52 (steps (1), (3), (6), and (7)) are changed to the following:

In step (6) second encryption IC 56 does not send separated data RR1 to MPU 53, but instead performs fixed conversion F( ) on separated data RR1, and sends the resulting data F(RR1) to MPU 53.

In step (7) MPU 53 does not compare random number R1 with separated data RR1, but instead performs the same conversion F( ) on random number R1 as used in the said step (6), and compares the resulting data F(R1) with data F(RR1) sent from second encryption IC 56.

In doing this the encrypted text C1 and a part of its plaintext RR1 can be prevented from flowing through the line of communication, so security against known plaintext attacks can be strengthened.

(2) The other method is to avoid using the challenge data in its original form as the data transfer key.

For example, in step (5) shown in FIG. 7, first encryption IC 94 does not use random number R1 in its original form as the data transfer key, but instead performs a fixed conversion F( ) on random number R1, and uses the resulting data F(R1) as the data transfer key.

Likewise, in stop (6) second encryption IC 96 does not use random number R1 in its original form as the data transfer key, but instead performs the same converter F( ) on random number R1 as in step (5), and uses the resulting data F(R2) as the data transfer key.

By doing this the data transfer key F(R1) can be concealed, and the security of the encryption is strengthened.

(3) The last method is to increase the complexity or the combination process.

For example, in step (9), the first encryption IC 54 does not combine random number R3 with separated data RR4 simply by lining them up by column, but instead performs a fixed conversion F( ) on R3 and RR4, and uses the resulting data F(R3, RR4) as the data transfer key.

Likewise, in step 10 the second IC 56 does not combine random number R4 with separated data RR3 simply by lining them up by column, but instead performs the same fixed conversion F( ) on R4 and RR3 as used in step (9), and uses the resulting data F(R3, RR4) as the data transfer key.

By doing this the procedure for generating the data transfer key becomes more complex, so the security of the encrypted communication is strengthened.

Specific Example of Suitable Application to a Communication System

In this manner the encryption apparatus of the present invention is equipped with a small-size encryption IC, and possesses the least amount of function necessary for preserving the security of communication between the devices. Therefore this encryption apparatus is ideal for communication devices which require secret communication and small circuitry, such as portable telephones and multimedia-related devices which handle digital copyrighted material.

FIG. (9) shows a concrete example of suitable application to a communication system of the encryption apparatus pertaining to this invention, and shows a playback system for digital copyrighted material, such as a movie.

This system is made up of optical disc drive apparatus 110 which corresponds to the first device of the previous embodiments, image playback apparatus 111 which corresponds to the second device, and SCSI cable 116, which connects these two. It is a system in which compressed image data read out from optical disc drive apparatus 110 is encrypted and sent to image playback unit 111, where images are played back.

Figure 10:
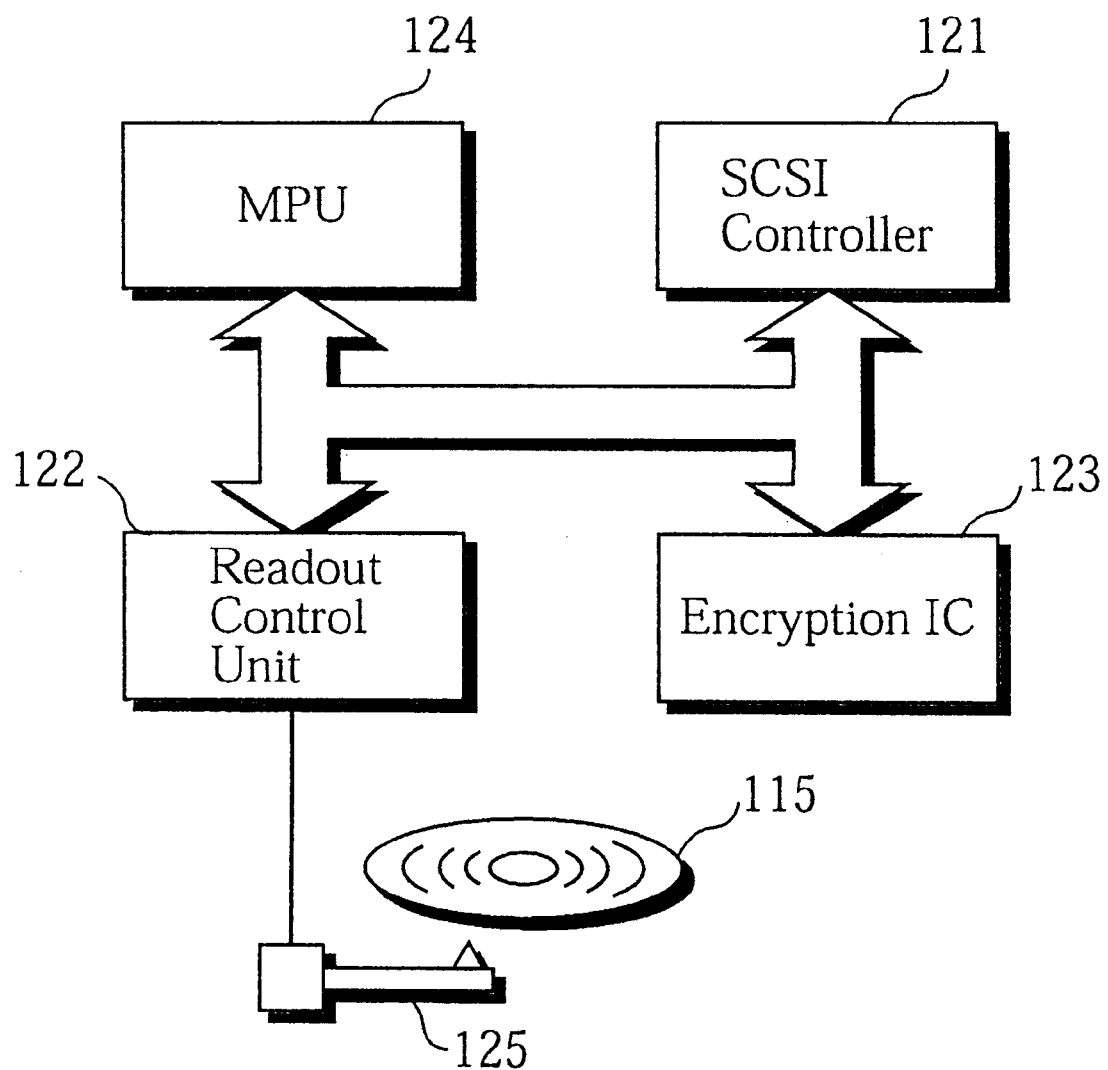
FIG. 10 is a block diagram showing the configuration of the optical disc drive apparatus 110 shown in FIG. 9.

FIG. 10 is a block diagram showing the configuration of optical disc drive apparatus 110.

Optical disc drive apparatus 110 is made up of MPU 124 which controls the entire apparatus, SCSI controller 121 which is the communication interface with image playback apparatus 111, readout control unit 122 which controls optical head 125 and controls readout of image data from optical disc 115, and encryption IC 123 which corresponds to the encryption IC in the first device in embodiments 1–4. After image playback unit 111 has been authenticated as a legitimate device, the image data recorded on optical disc 115 is read out, encrypted in encryption IC 123, and sent to image playback unit 111 through SCSI cable 116.

Figure 11:
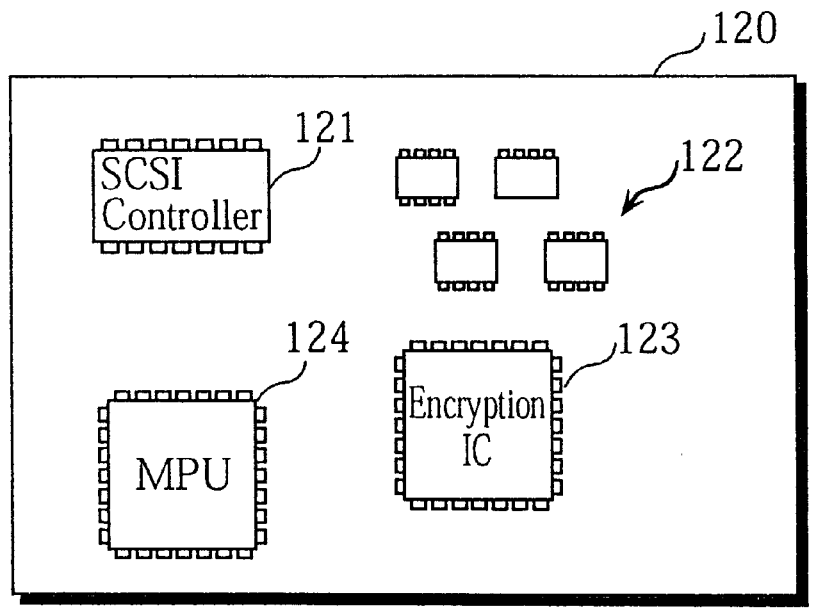
FIG. 11 is a diagram showing the outline of the circuit board mounted inside the optical disc drive apparatus 110.

FIG. 11 is a diagram showing an outline of the circuit board mounted inside the optical disc drive apparatus 110. Encryption IC 123 is an LSI formed from a single silicon board, and has the shape of a flat package molded in plastic.

Figure 12:
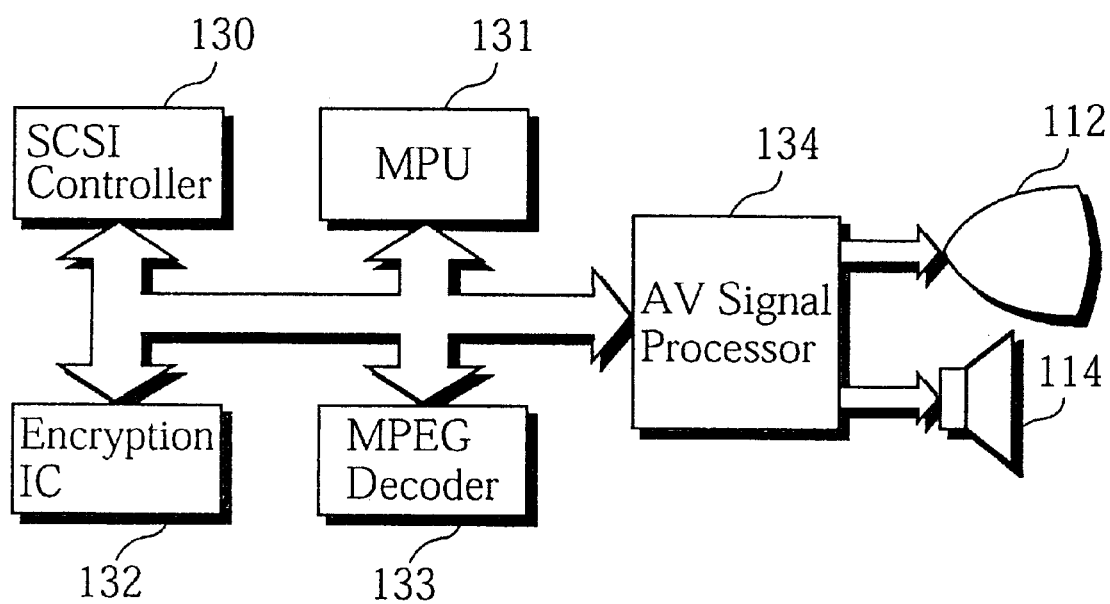
FIG. 12 is a block diagram showing the configuration of the image playback apparatus 111 shown in FIG. 9.

FIG. 12 is a block diagram showing the configuration of image playback apparatus 111.

Image playback apparatus 111 is made up of MPU 131 which controls the entire apparatus, SCSI controller 130 which is the communication interface with optical disc drive apparatus 110, encryption IC 132 which corresponds to the second device of embodiments 1–4, MPEG decoder 133 which conducts expansion of the compressed data decrypted by encryption IC 132, and AV signal processor 134 which converts the expanded image data into an analog image signal and outputs this to CRT 112 and speaker 114.

By applying the encryption apparatus pertaining to the present invention to this kind of image playback system, the digital copyrighted material recorded onto disc 115 is protected from improper copying. Thus the healthy development of the distribution market for multimedia-related products can be expected.

What is claimed is:

1. An encryption apparatus for devices which perform a challenge/response-type authentication of a device in communication, distribute a data transfer key to the device in communication and use the data transfer key to perform encrypted communication with the device in communication, the encryption apparatus comprising:

first random number generation means for generating first random number for distributing the data transfer key;

first random number storage means for storing the generated first random number;

first transmission means for incorporating the generated first random number into either challenge data or response data and transmitting either the challenge data or response data with the first random number to a device in communication, the challenge data being used to authenticate the device in communication and the response data being used to certify legitimacy of the encryption apparatus itself, wherein the device in communication is another device in current encrypted communication;

data transfer key generation means for generating the data transfer key through use of the first random number stored by the first random number R1 storage means, the data transfer key being time-varying;

transfer data encryption means for encrypting the transfer data to be transferred in the encrypted communication through use of the data transfer key, wherein the first random number generation means, the first random number storage means, the data transfer key generation means, and the transfer data encryption means are implemented through a single IC chip, and wherein the first random number storage means stores the first random number in an area tamper-proof from outside the single IC chip.

2. The encryption apparatus of claim 1, further comprising:

first encryption means for encrypting the first random number, wherein the first encryption means is realized by circuits inside the IC, and wherein the first transmission means transmits the first random number, encrypted by the first encryption means, to the device in communication.

3. The encryption apparatus of claim 2, wherein each of the devices which conduct encrypted communication authenticates the other device as a legitimate device by performing communication based on a challenge/response-type authentication protocol, wherein each encryption apparatus further comprises:

second random number generation means for generating a second random number to be used as challenge data to be transmitted to the device in communication; and authentication means for judging whether response data returned from the device in communication in response to the challenge data and the second random number match, and in case of a match, for authenticating the device in communication as a legitimate device, and wherein the data transfer key means generates the data transfer key in the event of authentication.

4. The encryption apparatus of claim 3, wherein the second random number generation means and the authentication means are implemented by circuits provided outside the IC.

5. The encryption apparatus of claim 4, further comprising:

a decryption means for decrypting encrypted combined data sent from the device in communication;

a separation means for separating the decrypted combined data into a first separated data which corresponds to response data and a remaining second separated data; and second transmission means for transmitting the first separated data to the device in communication, wherein the first encryption means combines first random number with the second random number, and encrypts the resulting combined data, and the data transfer key generation means generates the data transfer key by combining the first random number with the second separated data, and the decryption means and the separation means are implemented through circuits inside the IC.

6. The encryption apparatus of claim 5, wherein an encryption algorithm used by the transfer data encryption means in identical to an algorithm used by at least one of the first encryption means and the decryption means.

7. The encryption apparatus of claim 5, wherein the encryption algorithm of the transfer data encryption means differs from and is simpler than an algorithm used by either of the encryption and the decryption means.

8. The encryption apparatus of claim 7, wherein the transfer data encryption means divides the transfer data into blocks and encryption each block using part corresponding to the data transfer key.

9. The encryption apparatus of claim 8, wherein transfer data encryption means conducts encryption using exclusive OR on the blocks and data transfer key.

10. The encryption apparatus of claim 9, wherein the encryption performed by the first encryption means and the encryption performed by the second encryption means use the same conversion algorithm.

11. The encryption apparatus of claim 10, wherein the first encryption means and the decryption means decrypt and encrypt using key data stored in advance inside the IC, and, wherein one part of the key data is stored in a mask ROM area inside the IC, and the other part is stored in a programmable ROM area inside the IC.

12. The encryption apparatus of claim 4 further comprising:

second transmission means for transmitting the second random number to the device in communication as challenge data;

decryption means for decrypting encrypted combined data sent from the device in communication; and separation means for separating decrypted combined data into a first separated data corresponding to the response data, and a remaining second separated data, wherein the authentication means performs the judgement and authentication with the first separated data as the response data sent back from the device in communication, wherein the first encryption means combined the challenge data sent from the device in communication with the first random number, and encrypts the resulting combined data, and wherein the data transfer key generator generates the data transfer key by combining the first random number with the second separated data, and the decryption means and the separation means are implemented by circuits inside the IC.

13. The encryption apparatus of claim 12, wherein an encryption algorithm used by the transfer data encryption means is identical to an algorithm used by at least one of the first encryption means and the decryption means.

14. The encryption apparatus of claim 12, wherein the encryption algorithm of the transfer data encryption means differs from and is simpler than an algorithm used by either of the encryption and the decryption means.

15. The encryption apparatus of claim 14, wherein the transfer data encryption means divides the transfer data into blocks and encryption each block using part corresponding to the data transfer key.

16. The encryption apparatus of claim 15, wherein transfer data encryption means conducts encryption using exclusive OR on the blocks and data transfer key.

17. The encryption apparatus of claim 16, wherein the encryption performed by the first encryption means and the encryption performed by the second encryption means use the same conversion algorithm.

18. The encryption apparatus of claim 17, wherein the first encryption means and the decryption means decrypt and encrypt using key data stored in advance inside the IC, and, wherein one part of the key data is stored in a mask ROM area inside the IC, and the other part is stored in a programmable ROM area inside the IC.

19. The encryption apparatus or claim 2, wherein each of the devices which conduct encrypted communication authenticates the other device as a legitimate device by performing communication based on a challenge/response-type authentication protocol, wherein each encryption apparatus further comprises:

decryption means for decrypting encrypted combined data sent from the device in communication in response to the challenge data;

separation means for separating decrypted combined data into a first separated data which corresponds to the response data and a remaining second separated data;

authentication means which judges whether or not the first random number matches the first separated data, and in the event of a match, authenticates the device in communication as a legitimate device;

second encryption means for encrypting the second separated data in the event of authentication; and second transmission means which transmits the encrypted second separated data to the device in communication as response data, wherein the data transfer key generation means generates the data transfer key by combining the first random number and the second separated data, wherein the decryption means, the separation means, and the second encryption means are implemented through circuits inside the IC.

20. The encryption apparatus of claim 19, wherein an encryption algorithm used by the transfer data encryption means is identical to an algorithm used by at least one of the first encryption means and second encryption means and the decryption means.

21. The encryption apparatus of claim 19, wherein the encryption algorithm of the transfer data encryption means differs from and is simpler than an algorithm used by either of the encryption and the decryption means.

22. The encryption apparatus of claim 21, wherein the transfer data encryption means divides the transfer data into blocked and encryption each block using part corresponding to the data transfer key.

23. The encryption apparatus of claim 22, wherein transfer data encryption means conducts encryption using exclusive OR on the blocks and data transfer key.

24. The encryption apparatus of claim 23, wherein the encryption performed by the first encryption means and second encryption means and the encryption performed by the second encryption means use the same conversion algorithm.

25. The encryption apparatus of claim 24, wherein the first encryption means and second encryption means and the decryption means decrypt and encrypt using key data stored in advance inside the IC, and, wherein one part of the key data is stored in a mask ROM area inside the IC, and the other part is stored in a programmable ROM area inside the IC.

26. A communication system made up of a transmitter and a receiver which conduct distribution of a data transfer key and encrypted communication using the data transfer key, the transmitter and receiver, being devices in communication which mutually authenticate each other through communication based on an authentication protocol of challenge/response type, wherein the transmitter and the receiver each comprise:

first random number generation means for generating a first random number to be used as challenge data;

second random number generation means for generating a second random number to be used as the data transfer key;

combination means for combining the first random number with the second random number;

encryption means for encrypting the combined data;

first transmission means for transmitting the encrypted combined data to the device in communication;

first receiving means for receiving the encrypted combined data sent from the first transmission means;

decryption means for decrypting the received combined data;

separation means for separating the decrypted combined data into a first separated data which corresponds to the response data, and a remaining second separated data to be used for the data transfer key;

second transmission means for transmitting the first separated data to the device in communication as response data, second receiving means for receiving the first separated data returned from the second transmission means of the device in communication;

comparison means which compares the received first separated data with the first random number, and in the event of a match, authenticates the device in communication as a legitimate device;

data transfer key generation means for generating the data transfer key by combining the second random number with the second separated data; and encrypted communication means for conducting encrypted communication with the device in communication by using the generated data transfer key when authentication has been achieved;

wherein, the second random number generation means, the combination means, the encryption means, the decryption means, the separation means, the data transfer key generation means, and the encrypted communication means are implemented in a circuit in a single IC chip.

27. A communication system made up of a transmitter and a receiver which conduct distribution of a data transfer key and encrypted communication using the data transfer key, the transmitter and receiver, being devices in communication which mutually authenticate each other through communication based on an authentication protocol of challenge/response type, wherein the transmitter and the receiver each comprise:

first random number generation means for generating a first random number to be used as challenge data;

first transmission means for transmitting the first random number to the device in communication;

first receiving means for receiving the first random number sent from the first transmission means of the device in communication;

second random number generation means for generating a second random umber to be used for the data transfer key; combination means for combining the received first random number with the second random number;

encryption means for encrypting the combined data; second transmission means for transmitting the encrypted combined data to the device in communication;

second receiving means for receiving the encrypted combined data sent from the second transmission means of the device in question;

decryption means for decrypting the received combined data;

separation means for separating the decrypted combined data into a first separated data which corresponds to the response data and a second separated data to be used for the data transfer key;

data transfer key generation means for generating the data transfer key by combining the second random number with the second separated data; and encrypted communication means for conducting encrypted communication with the device in communication by using the generated data transfer key when authentication has been achieved;

wherein, the second random number generation means, the combination means, the encryption means, the decryption means, the separation means, the data transfer key generation means, and the encrypted communication means are implemented in a circuit in a single IC chip.

28. A communication system made up of a transmitter and a receiver which conduct distribution of a data transfer key and encrypted communication using the data transfer key, the transmitter and receiver, being devices in communication which mutually authenticate each other through communication based on an authentication protocol of challenge/response type, wherein the transmitter comprises:

first random number generation means for generating a first random number;

first encryption means for encrypting the first random number; and first transmission means for transmitting the encrypted first random number to the receiver, wherein the receiver comprises:
first receiving means for receiving the encrypted random number;

first decryption means for decrypting the received first random number;

second random number generator for generating a second random number;

first combination means for generating combined data by combining the first random number with the second random number;

second encryption means for encryption the combined data; and second transmission means for transmitting the encrypted combined data to the transmitter, wherein the transmitter further comprises:
second receiving means for receiving the encrypted combined data;

second decryption means for decrypting the received combined data;

a separation means for separating the decrypted combined data into a first separated data which corresponds to the first random number and a second separated data which corresponds to the second random number;

first comparison means which compares the first random number with the first separated data, and in the event of a match, authenticates the receiver as a legitimate device;

third encryption means for encrypting the second separated data in the event of authentication; and first data transfer key generation means for generating the data transfer key by combining the first random number generated by the first random number generation means and second separated data obtained by the separation means wherein the receiving means further comprises:
third receiving means for receiving the encrypted second separated data;

third decryption means for decrypting the received second separated data;

second comparison means which compares the decrypted second separated data with the second random number, and in the event of a match, authorizes the transmitter as a legitimate device; and second data transfer key generation means for generating the data transfer key by combining the first random number obtained by the first decryption means with the second random number generated by the second random number generation means, wherein the transmitter further comprises:
fourth encryption means for encrypting transfer data using the data transfer key generated by the first data transfer key generation means; and fourth transmission means for transmitting the encrypted transfer data to the receiver, and wherein the receiver also comprises:
fourth receiving means to receive the encrypted transfer data from the transmitter; and fourth decryption means for decrypting the encrypted transfer data using the data transfer key generated by the second data transfer key generation means, wherein, the first random number generation means, the first encryption means, the second decryption means, the separation means, the first comparison means, the third encryption means, the first data transfer key generation means, the fourth encryption means, and the fourth decryption means of the transmitter are implemented in a circuit in a single IC chip, and the first decryption means, the second random number generation means, the first combination means, the second encryption means, the third decryption means, the second separation means, and the second data transfer key generation means of the receiver are implemented in a circuit in a single IC chip.

29. A communication device which performs a challenge/response-type authentication of a device in communication, distributes a data transfer key to the device in communication and use the data transfer key to perform encrypted communication with the device in communication, the communication device comprising:

first random number generation means for generating a first random number to be used for authenticating the device in communication;

second random number generation means for generating a second random number to be used for data transmission;

combination means for combining the first random number with the second random number;

encryption means for encrypting the combined data;

first transmission means for transmitting the encrypted combined data to the device in communication as challenge data;

first receiving means for receiving challenge data from the device in communication;

decryption means for decrypting the received challenge data;

separation means for separating the decrypted challenge data into a first separated data which corresponds to response data, and a remaining second separated data to be used for the data transfer key;

second transmission means for returning the first separated data to the device in communication as response data;

second receiving means for receiving response data returned from the device in communication;

comparison means which compares the received response data with the first random number, and in the event of a match, authenticates the device in communication as a legitimate device;

data transfer key generation means for generating the data transfer key by combining the second random number with the second separated data; and encrypted communication means for conducting encrypted communication with the device in communication by using the generated data transfer key when authentication has been achieved, wherein the second random number generation means, the combination means, the encryption means, the decryption means, the separation means, the data transfer key generation means, and the encrypted communication means are implemented in a circuit in a single IC chip, and the first random number generation means, the first transmission means, the first receiving means, the second transmission means, the second receiving means, the comparison means are implemented in a circuit other than the circuit in the single IC chip.

30. A communication device which performs a challenge/response-type authentication of a device in communication, distributes a data transfer key to the device in communication and use the data transfer key to perform encrypted communication with the device in communication, the communication device comprising:

first random number generation means for generating a first random number to be used for authenticating the device in communication;

first transmission means for transmitting the first random number to the device in communication as challenge data;

first receiving means for receiving challenge data from the device in communication;

second random number generation means for generating a second random number to be used for data transmission;

combination means for combining the received challenge data with the second random number;

encryption means for encrypting the combined data;

second transmission means for returning the encrypted combined data to the device in communication as response data;

second receiving means for receiving response data returned from the device in communication;

decryption means for decrypting the received response data;

separation means for separating the decrypted response data into a first separated data which corresponds to challenge data, and a remaining second separated data to be used for data transmission;

comparison means which compares the first separated data with the first random number, and in the event of a match, authenticates the device in communication as a legitimate device;

data transfer key generation means for generating the data transfer key by combining the second random number with the second separated data; and encrypted communication means for conducting encrypted communication with the device in communication by using the generated data transfer key when authentication has been achieved, wherein the second random number generation means, the combination means, the encryption means, the decryption means, the separation means, the data transfer key generation means, and the encrypted communication means are implemented in a circuit in a single IC chip, and the first random number generation means, the first transmission means, the first receiving means, the second transmission means, the second receiving means, the comparison means are implemented in a circuit other than the circuit in the single IC chip.

31. A communication device which performs a challenge/response-type authentication of a device in communication, distributes a data transfer key to the device in communication and use the data transfer key to perform encrypted communication with the device in communication, the communication device comprising:

random number generation means for generating a random number to be used for authenticating the device in communication and for data transmission;

first encryption means for encrypting the random number;

first transmission means for transmitting the encrypted random number to the device in communication as challenge data;

receiving means for receiving first response data returned from the device in communication in response to challenge data;

decryption means for decrypting the received first response data;

separation means for separating the decrypted first response data into a first separated data which corresponds to the challenge data and a second separated data to be used for data transmission;

comparison means which compares the first separated data with the random number, and in the event of a match, authenticates the device in communication as a legitimate device; second encryption means for encrypting the second separated data;

second transmission means for transmitting the encrypted second separated data to the device in communication as second response data;

data transfer key generation means for generating the data transfer key by combining the random number with the second separated data; and encrypted communication means for conducting encrypted communication with the device in communication by using the generated data transfer key when authentication has been achieved, wherein the random number generation means, the first encryption means, the decryption means, the separation means, the second encryption means, the data transfer key generation means, and the encrypted communication means are implemented in a circuit in a single IC chip, and the first transmission means, the receiving means, the comparison means, and the second transmission means are implemented in a circuit other than the circuit in the single IC chip.

32. A communication device which performs a challenge/response-type authentication of a device in communication, distributes a data transfer key to the device in communication and use the data transfer key to perform encrypted communication with the device in communication, the communication device comprising:

random number generation means for generating a random number to be used for authenticating the device in communication and for data transmission;

transmission means for transmitting the random number to the device in communication as challenge data;

receiving means for receiving response data returned from the device in communication in response to challenge data;

decryption means for decrypting the received response data;

comparison means which compares the decrypted response data with the random number, and in the event of a match, authenticates the device in communication as a legitimate device; and encrypted communication means for conducting encrypted communication with the device in communication by using the random number as a data transfer key when authentication has been achieved, wherein the random number generation means, the decryption means, the comparison means, and the encrypted communication means are implemented in a circuit in a single IC chip, and the transmission means and the receiving means are implemented in a circuit other than the circuit in the single IC chip.

33. An encryption apparatus for devices which perform a challenge/response-type authentication of a device in communication, distribute a data transfer key to the device in communication and use the data transfer key to perform encrypted communication with the device in communication, the encryption apparatus comprising:

first random number generation unit for generating first random number for distributing the data transfer key;

first random number storage member for storing the generated first random number;

a first transmitter unit for incorporating the generated first random number into either challenge data or response data and transmitting either the challenge data or response data with the first random number to a device in communication, the challenge data being used to authenticate the device in communication, and the response data being used to certify legitimacy of the encryption apparatus itself, wherein the device in communication is another device in current encrypted communication;

data transfer key generator means for generating the data transfer key through use of the first random number stored by the first random number in the storage member, the data transfer key being time-varying;

a transfer data encryption unit for encrypting the transfer data to be transferred in the encrypted communication through use of the data transfer key, and a single IC chip consisting of the first random number generation unit, the first random number storage member, the data transfer key generator, and the transfer data encryption unit on a substrate, wherein the first random number storage member stores the first random number in a portion of the single IC chip which is tamper-proof from third party communications originating from outside the single IC chip.

* * * * *